United States Patent [19]
Kalyon et al.

[11] Patent Number: 5,391,929
[45] Date of Patent: Feb. 21, 1995

[54] ELECTRIC POWER TRANSMISSION SYSTEM AND METHOD OF ASYMMETRIC TRANSMISSION OF POWER TO MITIGATE MAGNETIC FIELDS

[75] Inventors: Dilhan M. Kalyon, Teaneck; Halit S. Gokturk, Hoboken; Sudhir B. Railkar, Clifton, all of N.J.

[73] Assignee: Stevens Institute of Technology, Hoboken, N.J.

[21] Appl. No.: 62,188

[22] Filed: May 17, 1993

[51] Int. Cl.⁶ .............................................. H02H 7/00
[52] U.S. Cl. ..................... 307/91; 361/107; 174/36
[58] Field of Search .............. 361/107, 117; 307/91, 307/143, 147, 148, 326; 174/36, 102 R, 40 CC, 73.1, 28

[56] References Cited

U.S. PATENT DOCUMENTS 5,061,685  9/1991  Kosuge et al. .......................... 505/1
5,175,442  12/1992  Ashley .................................. 307/91
5,218,507  6/1993  Ashley ................................. 361/107

Primary Examiner—Howard L. Williams
Assistant Examiner—Aditya Krishnan
Attorney, Agent, or Firm—Wyatt, Gerber, Burke & Badie, Francis C. Hand

[57] ABSTRACT

The method of power transmission and distribution aims to mitigate the magnetic fields generated at a right of way and at distances which extend beyond the right of way. The transmission and distribution lines use various line parameters including the relative locations of the conductors around the axis of symmetry of the right of way, the current magnitudes and the phase angles of the currents flowing in the conductors in optimum asymmetric fashion. The use of magnetic field mitigation bodies placed adjacent to the current bearing conductors increases the scope and the effectiveness of the mitigation. A mitigation technique is also provided for mitigating the magnetic field generated by current bearing sources used in power distribution, with unknown or difficult to characterize current distributions, such as transformers.

20 Claims, 20 Drawing Sheets

ELECTRIC POWER TRANSMISSION SYSTEM AND METHOD OF ASYMMETRIC TRANSMISSION OF POWER TO MITIGATE MAGNETIC FIELDS

This invention relates to an electric power transmission system and a method of asymmetric transmission of power to mitigate magnetic fields.

BACKGROUND OF THE INVENTION

Various sources of magnetic fields are encountered commonly in everyday life. These sources generally operate at extremely low frequencies, typically 50–60 Hz, and include electric power transmission and distribution lines, transformers and various appliances. While it may take several years before scientific studies conclusively prove the absence or the presence of health effects of such low frequency magnetic fields, public concern nevertheless currently exists.

There are many configurations for transmitting electric power, four of which are shown in FIGS. 1 and 2. These four configurations generally give rise to magnetic field values which are smaller than other conventional configurations. Typically, the known power transmission systems employ a delta arrangement of three conductors to conduct power in a three phase manner, such as shown in FIGS. 1a and 1b, or a superbundle and a low reactance double circuit, such as shown in FIGS. 2a and 2b. The magnetic field values which are generated by such configurations are tabulated below for comparison. The lowest conductor is assumed to be positioned at 14 meters (m) from the ground and the distance of separation between the conductors pertaining to different phases is kept at 10 meters (m). The edge of the right of way is at 30 meters (m) from the centerline of the configuration. These are the distances recommended for 500 kV electric power lines ["Transmission Line Reference Book, 345 kV and Above," J. J. LaForest, ed., 2nd Edition, Electric Power Research Institute (EPRI), Palo Alto, Calif.: 1987]. The time dependence of the currents flowing in phases A, B, and C at a frequency of 60 Hz are:

$$I_A = I \sin(2\pi 60 t + 2\pi/3) \quad (1)$$

$$I_B = I \sin(2\pi 60 t) \quad (2)$$

$$I_C = I \sin(2\pi 60 t - 2\pi/3) \quad (3)$$

where $I_A$ is the current passing through the conductor with phase A at time t. Similarly $I_B$ and $I_C$ are the currents for phases B and C respectively. I is the magnitude of the current and will be taken here as 1000 A. The magnetic field values given in the table are calculated numerically by using the EPRI computer program ENVIRO. Here, the resultant magnetic field vector is elliptically polarized. $B_{max}$ represents the maximum magnetic field corresponding to the major axis of the ellipse.

TABLE 1

Comparison of magnetic fields generated by representative single and double circuit configurations

| Configuration | FIG. # | $B_{max}$ at the edge of the right of way (mG) |
| --- | --- | --- |
| Horizontal delta, single circuit | 1a | 17.1 |
| Inverted delta, single circuit | 1b | 15.5 |
| Super bundle, double circuit | 2a | 47.2 |

TABLE 1-continued

Comparison of magnetic fields generated by representative single and double circuit configurations

| Configuration | FIG. # | $B_{max}$ at the edge of the right of way (mG) |
| --- | --- | --- |
| Low reactance, double circuit | 2b | 12.0 |

Therefore, the magnetic field magnitude values generated by various known electric power transmission configurations are high, i.e., generally in the range of 12.0 to 47.2 mG at the edge of the right of way. Thus, a need exists for electric power transmission and distribution lines, which generate considerably smaller magnetic field intensity values at the edge of the right of way and beyond.

In the case of current bearing magnetic field sources like the power transmission lines, the source is well characterized. Thus, the source characteristics, including the magnitude and phase angle of the currents of various conductors, can be used to completely describe the magnetic field distributions at all locations surrounding the source. On the other hand, there are many other examples of sources of low frequency magnetic fields used in power transmission and distribution with unknown or difficult to characterize current distributions. A good example is a transformer unit. For such cases, an additional need exists to develop a method for mitigating their magnetic fields.

Accordingly, it is an object of the invention to reduce the magnetic field magnitude at certain preferred locations along a right of way of an electrical power system.

It is another object of the invention to mitigate the magnetic field at a predetermined point spaced from a source producing the magnetic field.

It is another object of the invention to create a power transmission system so as to mitigate a magnetic field at predetermined points along a right of way.

SUMMARY OF THE INVENTION

In all of the electric power transmission and distribution lines used currently, the conductor locations are symmetric with respect to the axis of symmetry of the right of way. Furthermore, no attempt is made to deliberately tailor the current magnitudes and the balancing of the phase angles of the currents flowing in the conductors to minimize the magnetic fields generated. Thus, except for inadvertent variations in the current magnitudes and the phase angles, the magnetic field intensity values are symmetrical and similar at both edges of the right of way.

Briefly, the invention provides an improved electric power transmission system and an improved method for the transmission and distribution of electric power to reduce human exposure to magnetic fields generated by electric power transmission lines.

The invention also provides a system which employs a magnetic mitigating body adjacent a current bearing source having a magnetic field generated about the source so as to mitigate the magnetic field at a predetermined point spaced from the source.

The electric power transmission system is constructed in a manner to mitigate a magnetic field at a predetermined point along a right of way by affecting an asymmetric arrangement of the power lines and/or an appropriate control of the current magnitudes and phase angles of the currents flowing in the conductors. As will be shown with the preferred embodiments of the invention, the use of properly designed conductor locations and appropriately controlled amplitudes and phase angles of the currents, especially in an asymmetric fashion, gives rise to transmission lines, which generate magnetic field intensities which are considerably smaller at certain locations than those produced by the currently used transmission line technologies.

In one embodiment, the electric power transmission system is comprised of a plurality of sequentially arranged supports disposed along a right of way and at least one set of three current conductors (for a three phase mode of transmission) mounted on and along the supports and disposed longitudinally of the right of way. In accordance with the invention, the conductors are disposed in an array asymmetrically of a vertical plane passing through the array.

In another embodiment, two sets of three current conductors may be employed with one set disposed asymmetrically of the other set.

In order to further enhance magnetic field mitigation, a magnetic field mitigation body may be positioned in spaced relation to extend along one of the conductors of a set of conductors to mitigate the magnetic field at a predetermined point along the right of way.

The asymmetric configuration method and technology can be applied to existing electric power lines locally. If the magnetic fields from an electric power line need to be mitigated along a certain span, for example in the vicinity of a school or a hospital found at one side of the right of way, the electric power line can be altered only along the distance of the span. For example, the locations of the conductors of the electric power line can be modified and asymmetrical configurations achieved only along the necessary span, leaving the rest of the electric power line intact. The same concept can also be employed along the entire length of a new electric power line planned for installation.

The electrical power transmission and distribution lines can be configured not only by using the locations of the conductors but also by properly regulating the magnitudes and/or phase angles of the conductor currents to mitigate the magnetic fields. The asymmetric configurations of the transmission lines are also very suitable for incorporation of magnetic field mitigation bodies into the transmission system. Such mitigation bodies are produced from magnetic materials of proper dimensions to further mitigate the magnetic field at the edge of the right of way and beyond.

In another embodiment, the electric power transmission system may employ a means for distributing current to the conductors in asymmetric relation in order to mitigate a magnetic field at a predetermined point along the right of way.

In still another embodiment, the electric power transmission system may employ a means for shifting the phase angle of a current flowing in at least one predetermined length of at least one of the conductors of the system in order to mitigate a magnetic field at a predetermined point along the right of way.

In still another embodiment, one or more additional current conductors may be employed with an array of three current conductors with appropriate means for splitting a flow of current between the additional conductors and one or more of the conductors of the array in order to mitigate a magnetic field at a predetermined point along the right of way.

The above embodiments may also be employed in combinations of each other so as to achieve enhancement of the mitigation of a magnetic field at a predetermined point.

In the case of magnetic field generating sources, including transformers, with unknown or difficult to characterize internal current distributions, a different procedure needs to be followed. For such cases, on-site magnetic field distributions can be characterized to provide the mapping of magnetic field data. These magnetic field distributions surrounding the source are then used to select the shape, dimensions and physical properties of mitigating bodies with high relative permeability for the mitigation of the magnetic field in conjunction with the solution of the Maxwell equations. Reference to U.S. Pat. No. 5,365,115 dated Nov. 15, 1994 is made for further explanation of techniques for obtaining the mitigation of a magnetic field and such application is incorporated herein.

BRIEF DESCRIPTION OF THE DRAWINGS

These and other objects, features, elements and advantages of the invention will be more readily apparent from the following detailed description taken in conjunction with the accompanying drawings in which:

Referring to FIG. 1, a conventional electric power transmission system generally employs the conventional delta method of transmission and distribution of electric power for a single circuit in either a horizontal delta array (FIG. 1a) or an inverted delta array (FIG. 1b). In this case, three current carrying conductors, represented schematically by hollow circles are placed symmetrically at a distance of 10 m from each other with the lowermost current carrying conductor placed at 14 m from the ground level. The edges of the right of way are indicated by points —Q and Q, and are located at 30 m on either side of the axis of symmetry of the right of way. Time dependent currents flowing through the conductors with different phases are indicated by A, B, C where the phases A, B, C are intended to be balanced as given by equations 1–3.

Referring to FIG. 2, two conventional configurations of the double circuit method of transmission of electric power employ two sets of three conductors symmetric to each other and vertically aligned in each set. Once again the distance of separation of 14 m from the ground is maintained for the lowermost conductor and the distance of separation of 10 m is maintained between the conductors. The conventional double circuit configuration entitled the "superbundle" (shown in FIG. 2a) uses the same phase arrangements on either side of the center of the circuit whereas the configuration shown in FIG. 2b uses the reversed phases on either side of the centerline of the circuit and is entitled "low reactance". Thus, FIGS. 1 and 2 represent some of the conventional methods of transmission of electric power for single/double circuits which generate substantially high magnetic fields at the edge of the right of way.

FIG. 3 illustrates the schematic overview of the methodologies used to develop the basic principles for the method of transmission and distribution of electric power of this invention using various electric power line parameters and their combinations. The methodology essentially involves asymmetrical selection of three basic parameters namely, the distance of separation between the conductors, the magnitudes of the currents flowing through the conductors and the phase angles of the currents flowing through the conductors. Other than these parameters, the methodology of asymmetric configurations for electric power transmission can be achieved by the concept of current splitting. The method of transmission of electric power via the concept of current splitting essentially involves using two conductors instead of one to transmit the same power at the same phase angle. It can be seen from FIG. 3 that these different parameters can also be combined in various ways to generate configurations which are able to mitigate magnetic fields at selected locations.

PROCEDURE

Figure 1A:
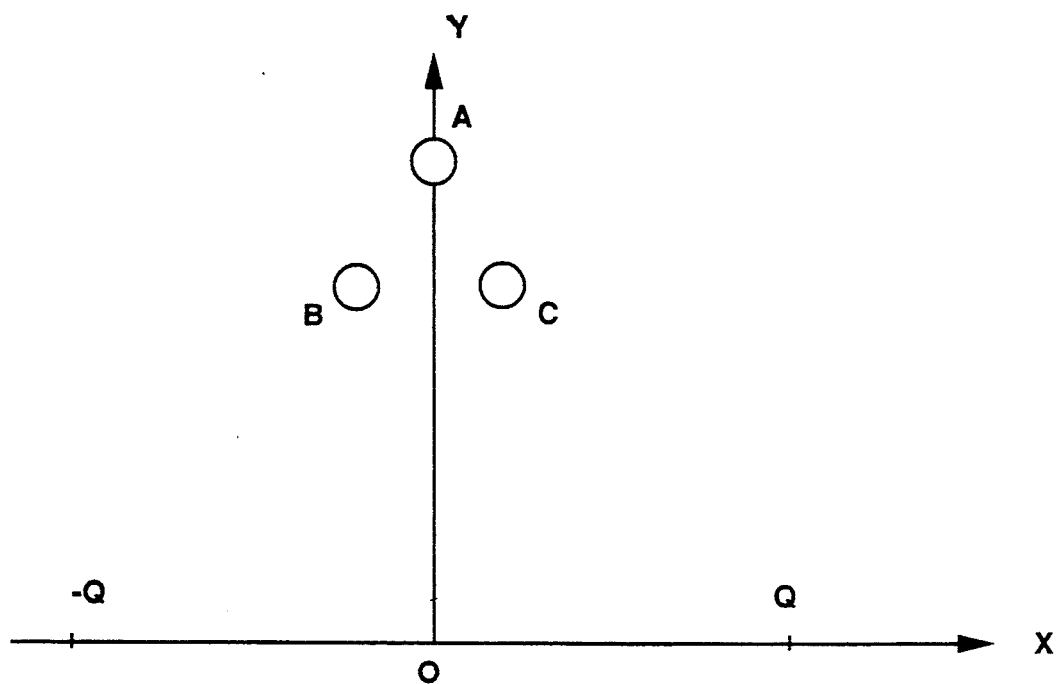
FIGS. 1a and 1b schematically illustrate cross-sectional views of two configurations of a conventional delta method of transmission of electric power.
Figure 1B:
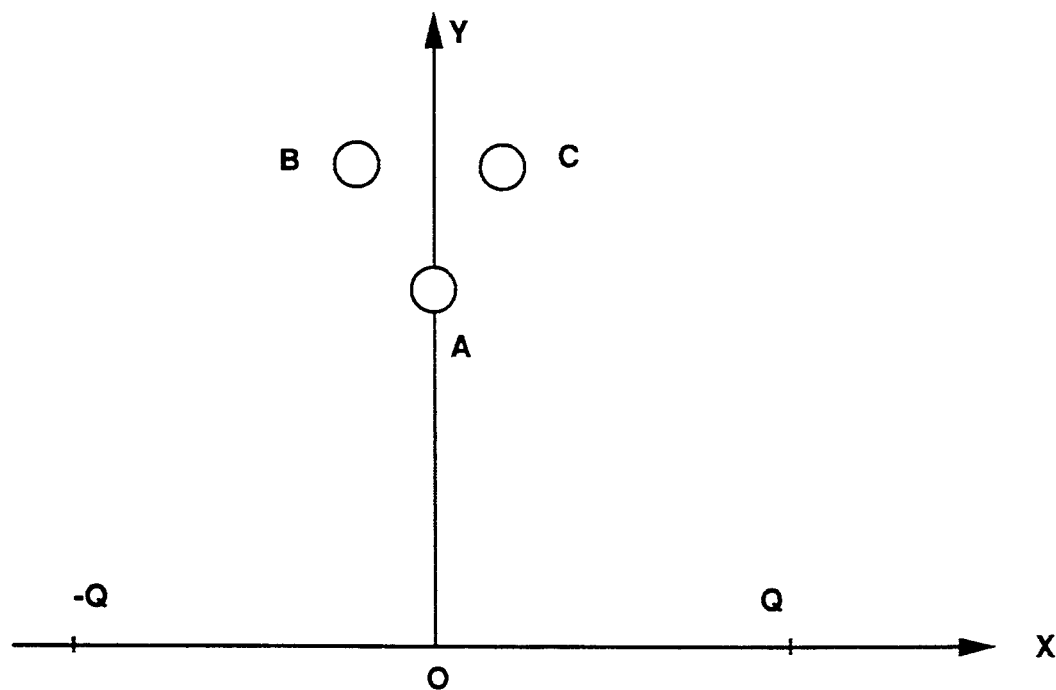

The method of transmission of electric power which mitigates the magnetic field via the asymmetrical design and control of the circuit parameters is not obvious and requires massive numerical simulation as well as experimental studies for confirmation. The determination of the magnetic field distributions requires the estimation of the magnetic fields over the entire magnetic field cycle. Within the time cycle, the magnetic field magnitude at the area at which fields are to be mitigated is calculated by dividing the time cycle into a number of time intervals (1000 in our case). The magnetic field magnitude is the square root of the sum of squares of the components of the magnetic field at the selected location. Hence, the maximum of these magnetic field magnitudes evaluated at the selected 1000 different time levels represents the major axis of an ellipsoid formed by the magnetic field components. This magnetic field magnitude corresponding to the major axis of the ellipsoid is used as the representative maximum magnetic field in mG for a given method of transmission of electric power. The magnetic fields generated by the source at a selected location are functions of the distance of separation between the source and the preferred location, the current passing through the source and the phase angle of the current at each conductor. The proper selection of these circuit parameters can yield magnetic fields arising from multiple sources to act in the opposite directions, so as to create cancellation of the overall magnetic field at preferred locations. If the design of the conductor locations or any selection of the magnitude and the phase angles of the currents are not properly done the magnetic field at the locations where mitigation is desired can ever increase.

To properly select the parameter(s) for mitigating the magnetic field at selected locations, numerical simulation of Maxwell's equations is used. The computer routines search throughout possible values of the parameter(s) within a range. Constraints that are required to be observed during the search include the minimum conductor to conductor separation and total current per phase. During the computer search, the set of parameters generating configurations which violate such constraints are neglected. The program identifies sets of values for the chosen parameter(s) which yield lower magnetic field magnitudes at the preferred location(s) than those obtained by the conventional methods of transmission and distribution of electric power. Out of these various sets of values of the selected parameter(s) each set of parameters corresponds to an asymmetric system which is capable of transmitting electric power while mitigating the magnetic fields at the selected location(s) substantially. Typically, a 6 conductor configuration, with each conductor moved into 9 different locations generates 0.5 million different configurations which need to be simulated for their magnetic field distributions.

The scope and effectiveness of the magnetic field mitigation obtained at selected locations by using asymmetric configurations can be increased by means of magnetic field mitigation bodies placed close to the current carrying wires. A magnetic field mitigation body may consist of various soft magnetic materials, including pultruded strips of soft magnetic materials, strips or assemblies of such magnetic materials, extruded profiles or molded bodies of magnetic composites consisting of soft magnetic fillers and conductive or nonconductive binders/matrices. The magnetic field pattern of the electric power line is determined by numerical or experimental means. The magnetic mitigation body is positioned adjacent to the source in a predetermined area of the magnetic field pattern. The mitigation body becomes magnetized under the influence of the source field. The magnetic field of the mitigation body alters the field of the original source, reducing the field in selected regions. The shape and size of the mitigation body depend on the magnetic field generated by the source, the physical properties of the magnetic body and the targeted magnetic field at the selected locations. The method for the search of the proper size and shape of the magnetic body involves the detailed solution of Maxwell's equations analytically or by employing numerical techniques. Furthermore, the search of the proper parameters of the magnetic mitigation body can be carried out simultaneously with the design of an asymmetric electric power line configuration. Experimental techniques may also be used for insight and validation of results.

Various aspects of the invention and its implementation in conjunction with the magnetic field mitigating bodies, are illustrated by the examples given below.

Figure 4:
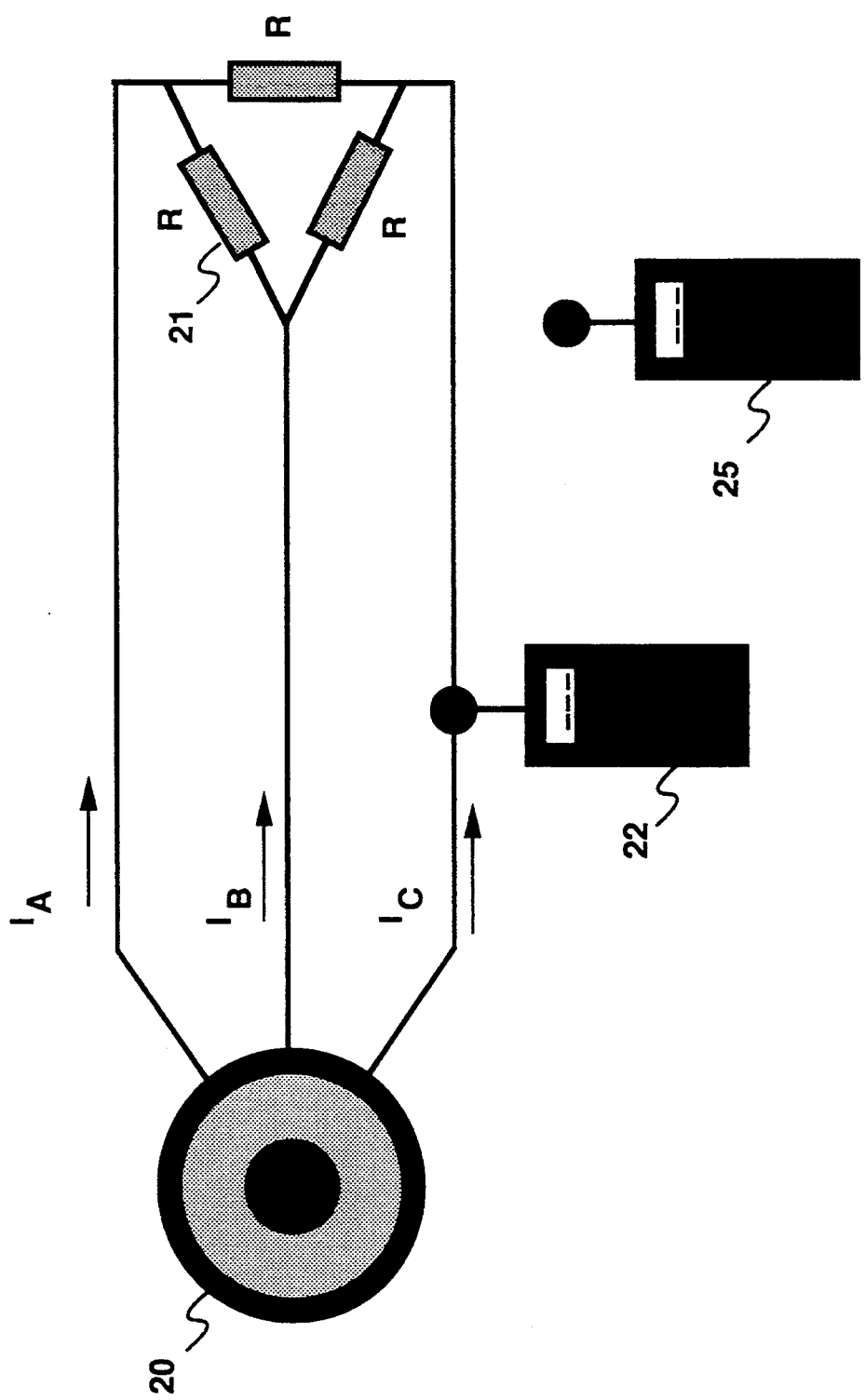
FIG. 4. illustrates an experimental setup used to test various embodiments of the method of transmission and distribution of electric power at low currents and voltages.

Some of the configurations resulting from the present method of transmission of electric power were also verified using the laboratory model at 100 scale, as shown in FIG. 4. The experimental setup consists of a 3 phase transformer 20 to generate currents of 5A–10A at about 10 Volts in a 3 phase balanced system along with a set of three load resistors 21. Clip on sensors 22 are used to measure currents and the magnetic field components are measured by using appropriate magnetic field sensors 25 only one of which is shown.

EXAMPLE 1

Figure 2A:
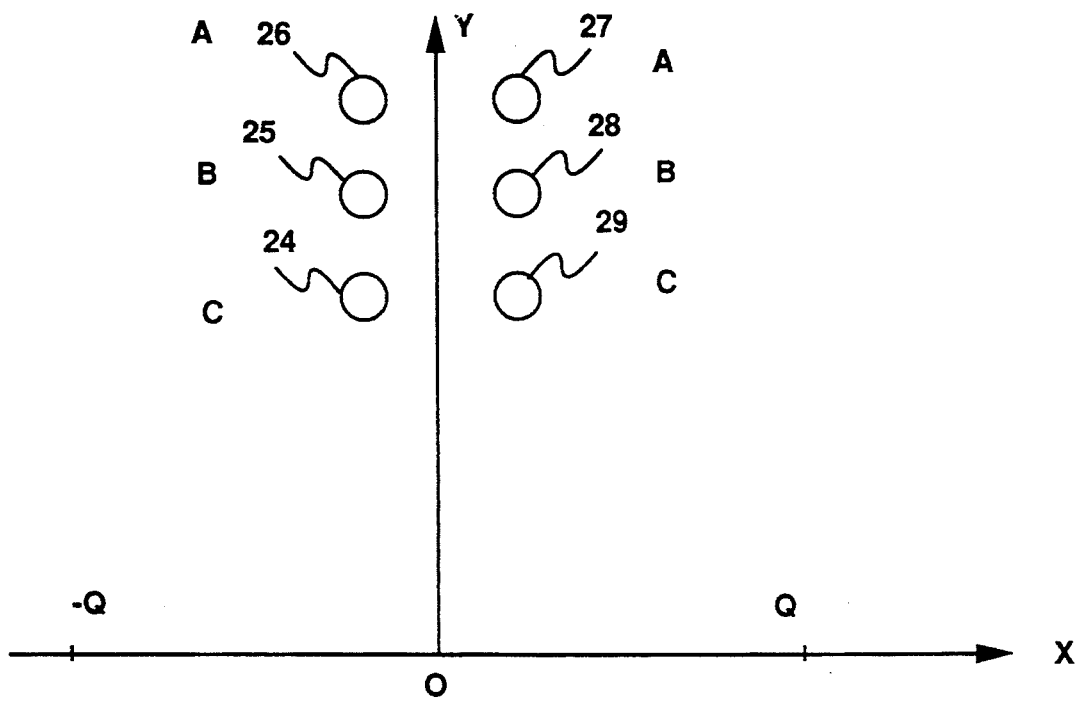
FIGS. 2a and 2b each schematically illustrate a cross-sectional view of a configuration for a conventional, superbundle and low reactance double circuit method of transmission of electric power.
Figure 2B:
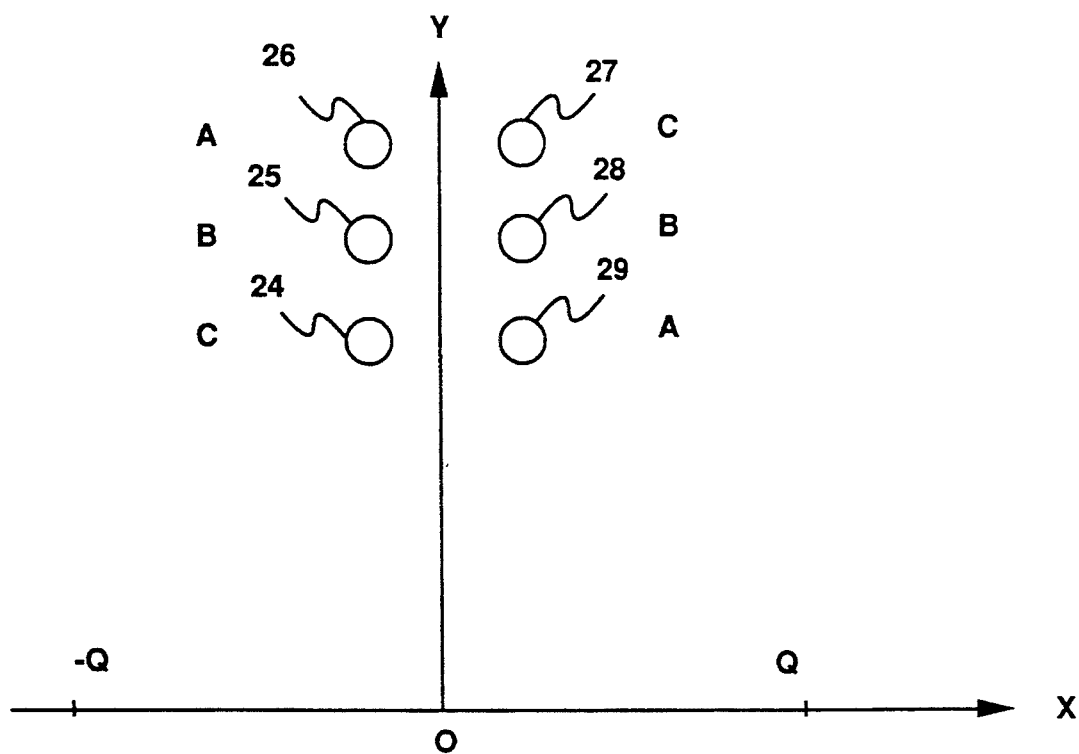
Figure 3:
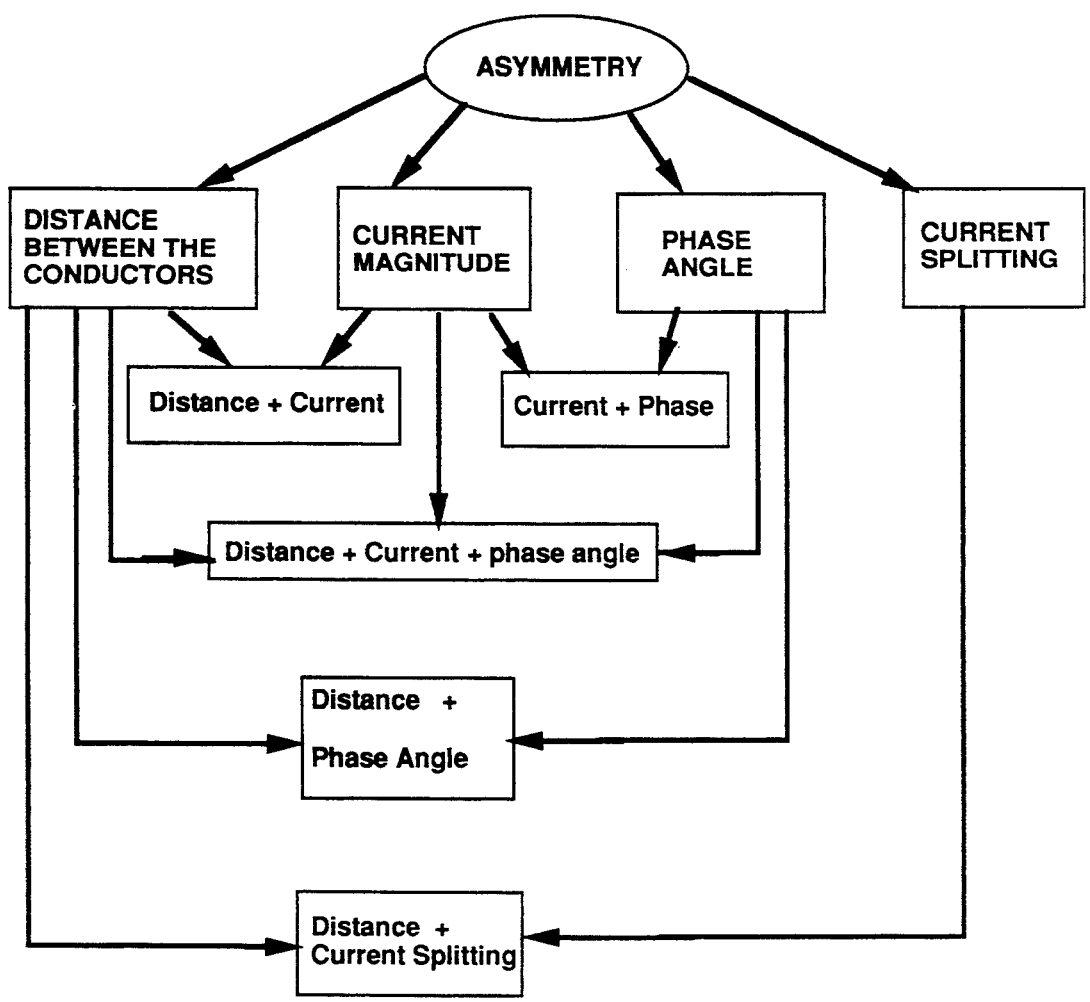
FIG. 3. illustrates an overview and a development of a method of transmission of electric power using electric power line parameters and their combinations in accordance with the invention.

Method of transmission of electric power employing asymmetrical positioning of the conductors and a mitigating magnetic body The transmission of electric power via the symmetric, conventional low reactance configuration is shown schematically in FIG. 2b. This configuration of six conductors 24–29 generates relatively the lowest magnetic field magnitude values at the edge of the right of way among the conventional double circuit configurations. Hence, this configuration is chosen as a benchmark against which all the double circuit asymmetric embodiments herein are to be compared.

Figure 5A:
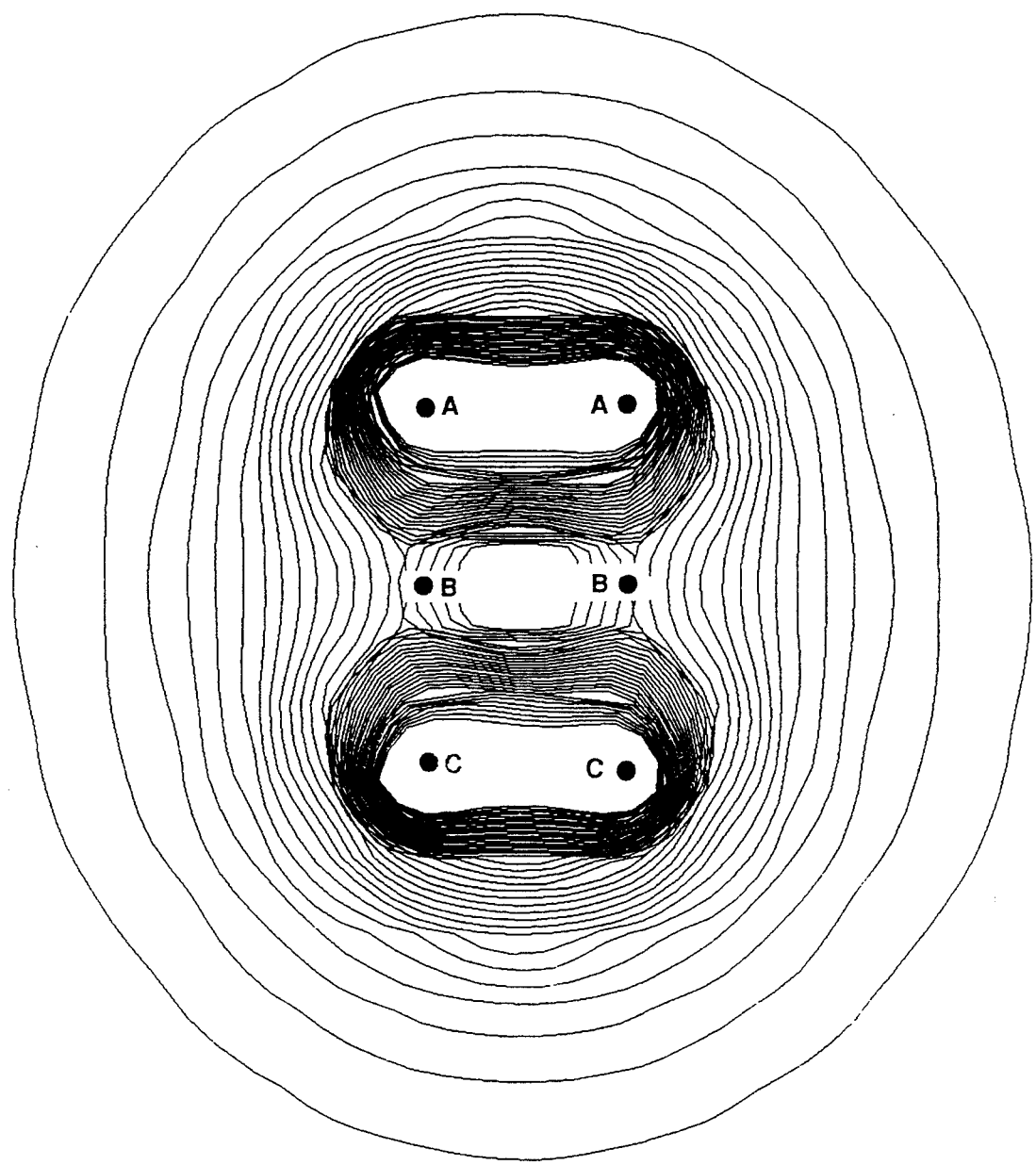
FIG. 5a. indicates contour plots of isomagnitude magnetic fields generated by currently available transmission line technologies.

FIG. 5a illustrates a numerical simulation of the magnetic field about the symmetric arrangement of conductors corresponding to the configuration shown schematically in FIG. 2b.

Figure 5B:
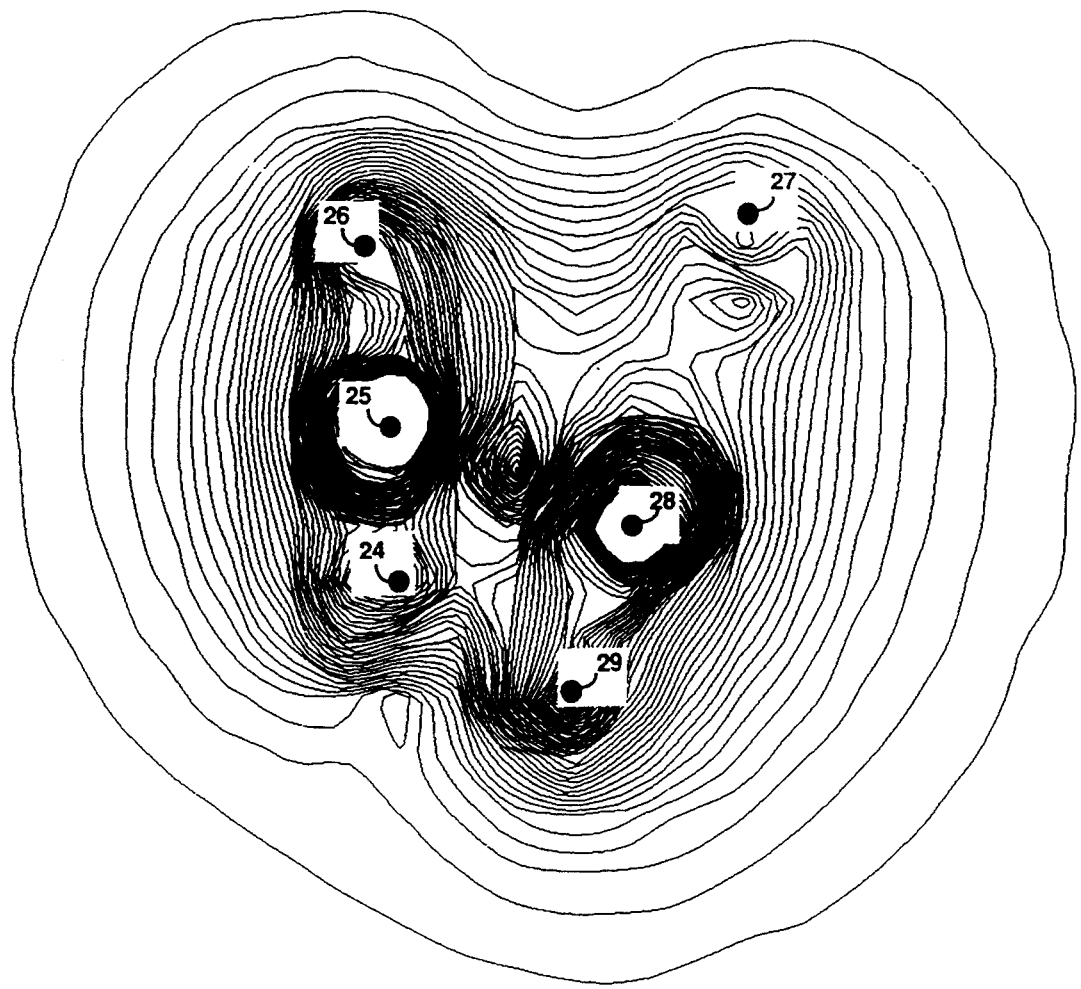
FIG. 5b indicates contour plots of isomagnitude magnetic fields generated by an asymmetric arrangement of conductors in accordance with the invention.

Referring to FIG. 5b, the locations of the six conductors 24–29 were selected by numerical simulation so as to reduce the magnetic field at one edge of the right of way namely at $-Q$ from FIG. 2b. As shown, the set of three current conductors 24, 25, 26 was mounted on a plurality of sequentially arranged supports (not shown) along and longitudinally of a right of way and disposed in a vertical array. The other set of conductors 27, 28, 29 was disposed in an array asymmetrically of a vertical plane passing through the array and asymmetrically of the first set of conductors 24–26.

The following table lists one method of transmission of electric power by employing the proper selection of the conductor locations obtained by the simulation methodology. The magnetic field magnitude at $-Q$ can be reduced from 12.0 mG for the symmetric low reactance configuration to 3.8 mG for the asymmetric configuration of this embodiment, resulting in a reduction of 68% in the magnitude of the magnetic field. The computer program utilized for the proper selection of conductor placements used a current magnitude, 1 of 1000 A per phase. Minimum separation between the conductors with different phase angles was constrained to 9 m. The constant magnitude magnetic field contours generated by the symmetric and the typical asymmetric configurations are plotted in FIG. 5. The contour plot obtained by the asymmetrical configuration shows compression of the magnetic field lines away from the edge of the right of way at $-Q$.

TABLE 2

Conductor locations of the conventional low reactance configuration and a representative asymmetric embodiment of this invention

| Conductors | Coordinates of the conventional low reactance, (x, y) | Coordinates of asymmetric low reactance (x, y) |
| --- | --- | --- |
| 1A | −5, 14 | −3.5, 36 |
| 1B | −5, 24 | −3, 27 |
| 1C | −5, 34 | −4, 18 |
| 2A | 5, 14 | 5, 14 |
| 2B | 5, 24 | 8.3, 23 |
| 2C | 5, 34 | 14, 35.8 |

Using the laboratory scale model described in FIG. 4 the above configuration was experimentally tested at 1/100 distance scale. Each phase in the experimental setup carried a peak current of 5 A. The asymmetry created by this rearrangement of the conductor locations generated a 1.2 mG magnetic field at $-Q$ whereas the corresponding conventional, i.e., symmetric low reactance configuration setup at the same scale generated a magnetic field magnitude of 7.15 mG. Thus, the use of properly selected asymmetric conductor locations gave rise to a reduction of 73% at $-Q$.

Figure 6:
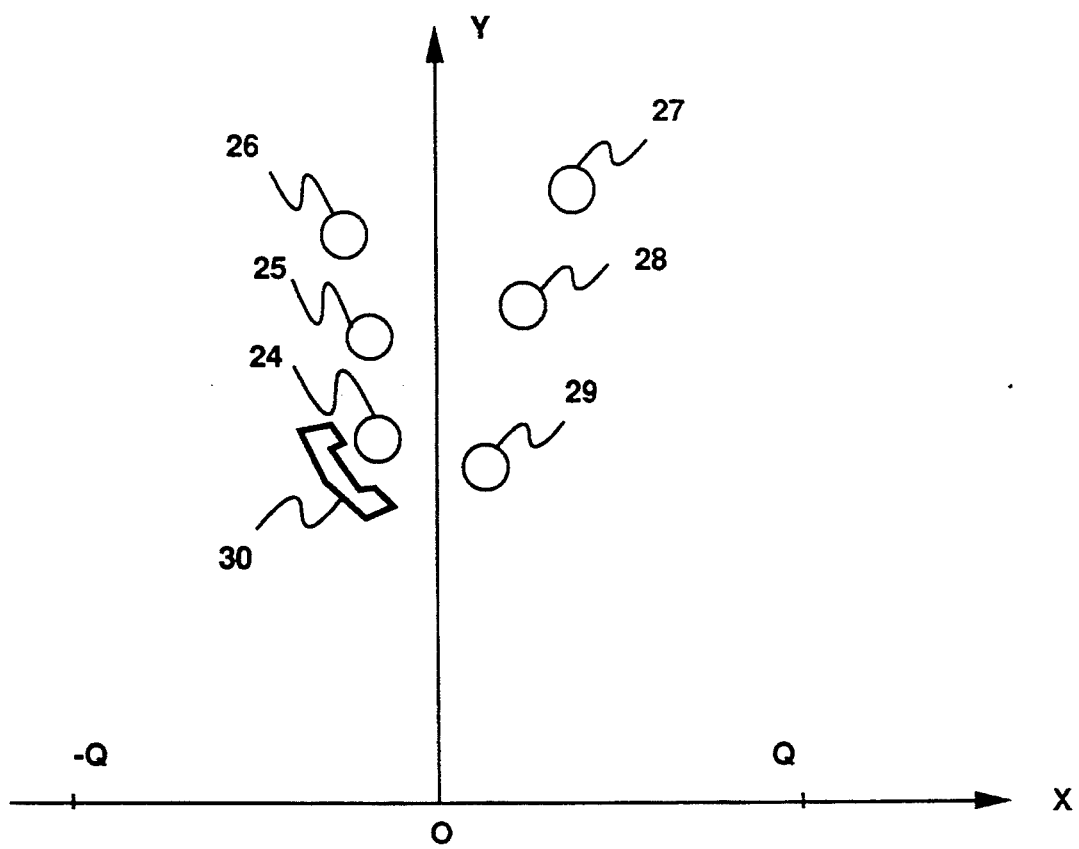
FIG. 6. schematically illustrates a cross-sectional view of an electric power transmission system employing asymmetrically selected conductor locations and a magnetic field mitigating body in accordance with the invention at an experimental 1:100 scale.

Referring to FIG. 6, wherein like reference characters indicate like parts as above, the second issue tested with the setup was the enhancement of mitigation by means of a magnetic field mitigation body 30 of proper shape and size. A cup shaped hollow magnetic field mitigating body 30 of overall dimensions 7 cm×3 cm and of thickness 0.002 cm was constructed from magnetic material Metglas 2705M. When this magnetic field mitigation body 30 was placed close to the lowest left conductor 24, as shown in FIG. 6, an additional reduction of 63% was obtained in the magnetic field magnitude at $-Q$. Thus, the combination of the magnetic field mitigation body 30 with the asymmetric placement of the conductors 24–29 creates an electric power transmission configuration which generates a magnetic field of 0.7 mG at one edge of the right of way, as compared to the 7.15 mG produced by the corresponding conventional and symmetric low-reactance configuration.

Thus, an overall 90% reduction in the magnitude of the magnetic field at one side of the right-of-way, i.e. at the location −Q can be obtained. This example demonstrates that it is possible to mitigate the magnetic fields substantially at the preferred locations by employing asymmetrically selected conductor configurations and a magnetic field body in accordance with the invention.

The following table indicates the numerical results obtained with the use of the magnetic filed mitigation body 30 as well as the X,Y coordinates of the conductors:

| CONFIGURATION | MAGNITUDE OF MAGNETIC FIELD IN mG | |
|---|---|---|
| | AT −Q | AT Q |
| CONVENTIONAL LOW-REACTANCE | 7.15 | 7.15 |
| ASYMMETRIC LOW REACTANCE WITHOUT MITIGATING BODY | 1.92 (73%) | 10.0 |
| ASYMMETRIC LOW REACTANCE WITH MITIGATING BODY ON LEFT | 0.7 (63%) | |
| REDUCTION COMPARED TO CONVENTIONAL CONFIGURATION | (90%) | |

| CONDUCTOR # | PHASES | X-Y COORDINATES |
|---|---|---|
| 24 | C | −4.0, 18.0 |
| 25 | B | −3.0, 27.0 |
| 26 | A | −3.5, 36.0 |
| 27 | C | 14.0, 35.7 |
| 28 | B | 8.2, 23.0 |
| 29 | A | 4.9, 14.0 |

EXAMPLE 2

Method of transmission of electric power by asymmetrical selection of the current magnitudes In the existing low reactance method of transmission of electric power (FIG. 2b) each phase carries a current I, in balanced operation. This example illustrates the creation of an asymmetric configuration by redistribution of the conductor currents while keeping the total current magnitude constant for each phase. In this respect, suitable means (not shown) were provided for distributing current to the conductors in asymmetric relation to mitigate the magnetic field at the point −Q. An important advantage of this method of transmission of electric power is that it can be implemented without physically moving the conductors of an existing electric power line configuration.

By way of example, current asymmetry can be accomplished in a number of different ways. One approach is to extend the method of phase splitting to more than two conductors. Consider four similar conductors connected in parallel; each conductor carries ¼th the total current. If three of the conductors are bundled together and the remaining one is kept separate, the total current of the phase is split 75% and 25%, respectively. Another approach would be to use conductors that have different electrical characteristics. For example, one of the conductors may be three times more resistive than the other. When two such conductors are connected in parallel, the conductor that is three times more resistive will carry 25% of the total current.

Another approach is to control the currents flowing in different conductors electronically. Electronic components for high voltage control applications are becoming more readily available as reported in IEEE's Spectrum, January 1993, page 81, column 1.

The table given below lists one redistribution of the conductor current magnitudes that reduces the magnetic field at the selected location −Q to 2 mG. This configuration was again determined by application of numerical simulation. As compared to the 12 mG generated by symmetric low reactance configuration shown in FIG. 2b, the redistribution of currents generates a 83% reduction in the magnitude of the magnetic field. In the optimization program used to determine the optimum current amplitudes, total current magnitude for each phase was taken as 2000 A and the minimum and maximum current magnitudes for each conductor were limited to 400 A and 1600 A, respectively.

TABLE 3

The conductor currents of a conventional low reactance configuration and a typical asymmetric configuration

| Conductors | Conventional current amplitudes (A) | Asymmetric current amplitudes (A) |
|---|---|---|
| 1A | 1000 | 1010 |
| 1B | 1000 | 450 |
| 1C | 1000 | 580 |
| 2A | 1000 | 990 |
| 2B | 1000 | 1550 |
| 2C | 1000 | 1420 |

EXAMPLE 3

Figure 16:
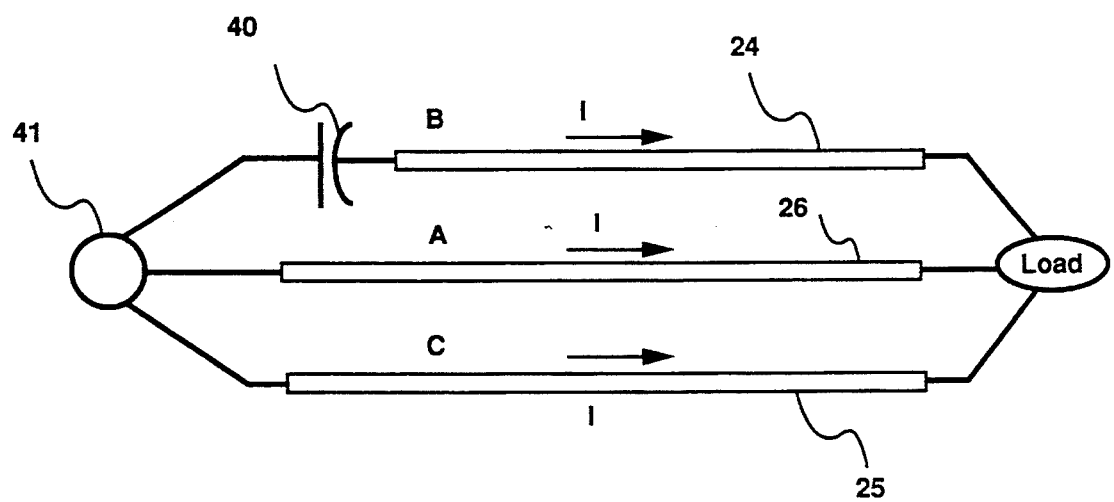
FIG. 16 schematically illustrates a means of effecting phase asymmetry in accordance with the invention.

Method of transmission of electric power by asymmetrical selection of the phase angles The existing method of transmission of electric power in a 3-phase circuit attempts to maintain a fixed phase angle of 120° between the phases as described by equations 1-3. In accordance with the invention, one or more of these phase angles can be altered, for example, by suitable means such as shown in FIG. 16. In this example, a capacitor 40 is connected in series with a conductor 24, for shifting the phase angle of the current delivered from a suitable source 41 and flowing in at least one predetermined length of the conductor 24 to mitigate the magnetic field at a point along the right of way. The deliberate proper shift in the phase angle of any one of the conductors changes the resultant magnetic field at the edge of the right of way. The proper selection of the phase angles can be utilized to mitigate the magnetic fields at selected locations.

Figure 17:
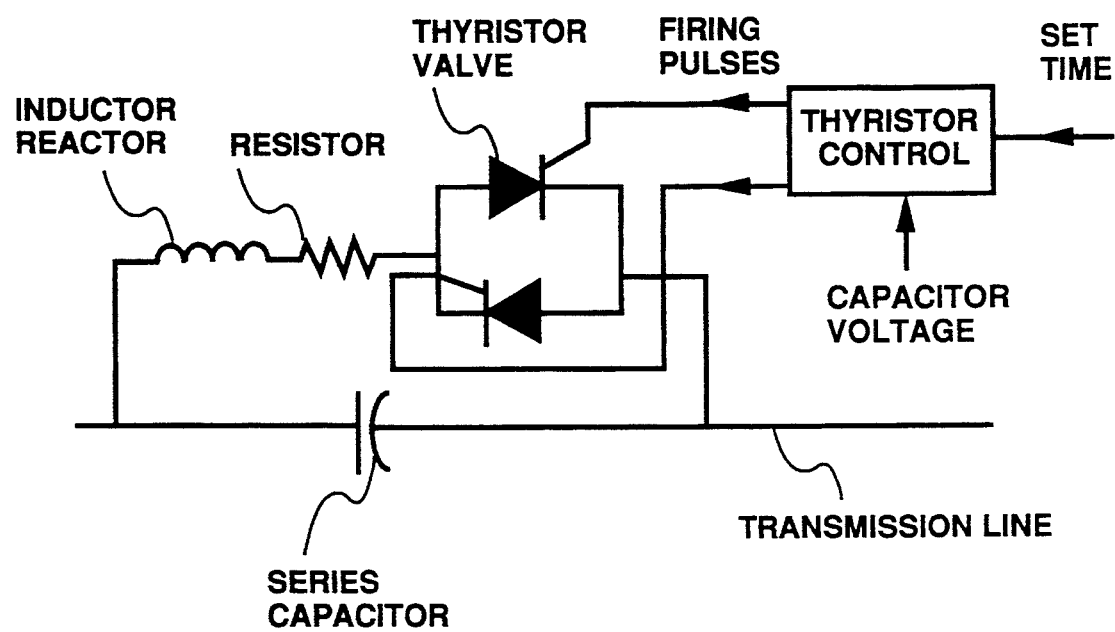
FIG. 17 illustrates one embodiment of a circuit for controlling the impedance of one of the phases of a transmission line.
Figure 18:
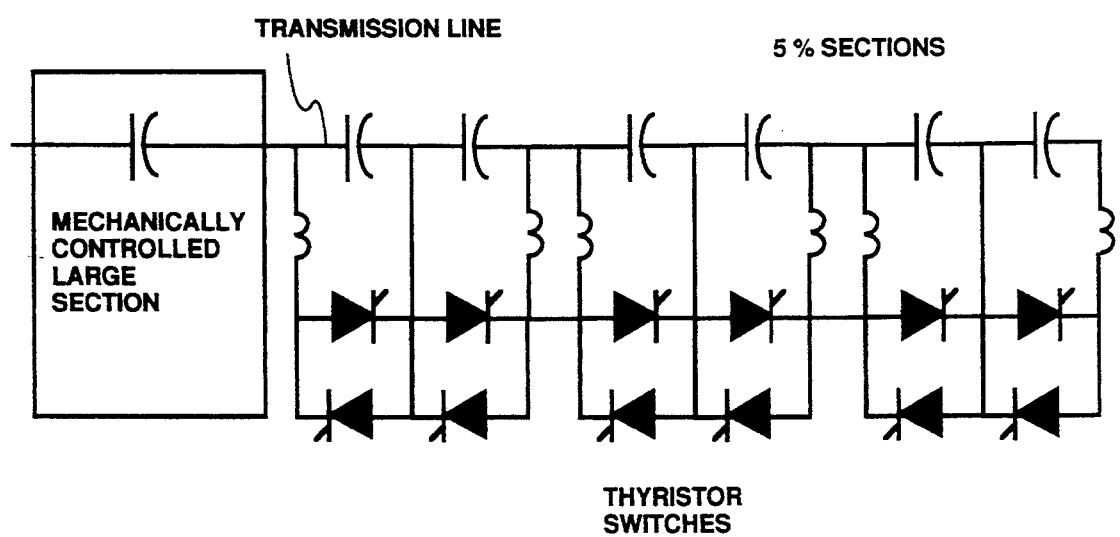
FIG. 18 schematically illustrates a second embodiment of a circuit for controlling the impedance of one of the phases of a transmission line.

As described in IEEE Spectrum, April 1993, pages 40 to 45, transmission line parameters such as line impedance and phase angle can be controlled by means of thyristor valves and associated electronics. Although the purpose is to obtain a tighter control of power flow and increased use of transmission capacity, these same techniques may be used to control the current and phase angle values. One example which is described is a control scheme that is suggested to alter the impedance of a line. Since the impedance determines both the magnitude and phase angle of the current flowing through the line, this scheme can be adapted to implement current and/or phase asymmetries in a manner as described above. FIGS. 17 and 18 each illustrates two circuits from the publication which can alter, in a controlled manner, the impedance of one of the phases of a transmission line.

Similar to the case of Example 2, this method of transmission or distribution of electric power can be implemented without changing the conductor positions of an existing electric power line.

The table given below illustrates a method of transmission of electric power via the proper selection of the phase angle of only one of the conductor currents of the conventional, symmetric low reactance configuration. The preferred location where mitigation is desired was again chosen as one edge of the right of way, −Q, where a magnetic field magnitude of 7.7 mG (a reduction of 36%) is obtained. During the systematic computer search using our numerical analysis, the maximum phase shift allowed was limited to 30°.

TABLE 4

The phase angles of the conductor currents of a conventional low reactance configuration and an asymmetric configuration

| Conductor | Conventional phase angles | Asymmetric phase angles |
|---|---|---|
| 1A | 120° | 120° |
| 1B | 0° | 0° |
| 1C | 240° | 240° |
| 2A | 120° | 120° |
| 2B | 0° | 20° |
| 2C | 240° | 240° |

EXAMPLE 4

Method of transmission of electric power via the concept of current splitting

Referring to FIG. 1a, the conventional delta configuration for the transmission and distribution of electric power produces a magnetic field of 17.1 mG at both sides of the right of way for the given example. Using the concept of current splitting, currents flowing with phases B and C are split by introducing two additional conductors 31, 32 as shown by solid circles in FIG. 7. As indicated, the added conductors, 31, 32 were mounted on and along the same supports as the three main conductors with one added conductor 31 above and in a common vertical plane with the uppermost conductor and the other added conductor 32 spaced in parallel to the conductor Means (not shown) were also provided to split a flow of current between a respective additional conductor 31, 32 and the main conductors 24, 25.

This method of transmission of electric power via the concept of asymmetric current splitting generates a magnetic field of 8.5 mG and 4.3 mG at locations −Q and Q, respectively. Thus, this asymmetric configuration generates a magnetic field mitigation of 53% and 75% at locations −Q and Q, respectively, in comparison to the conventional delta configuration.

Figure 7:
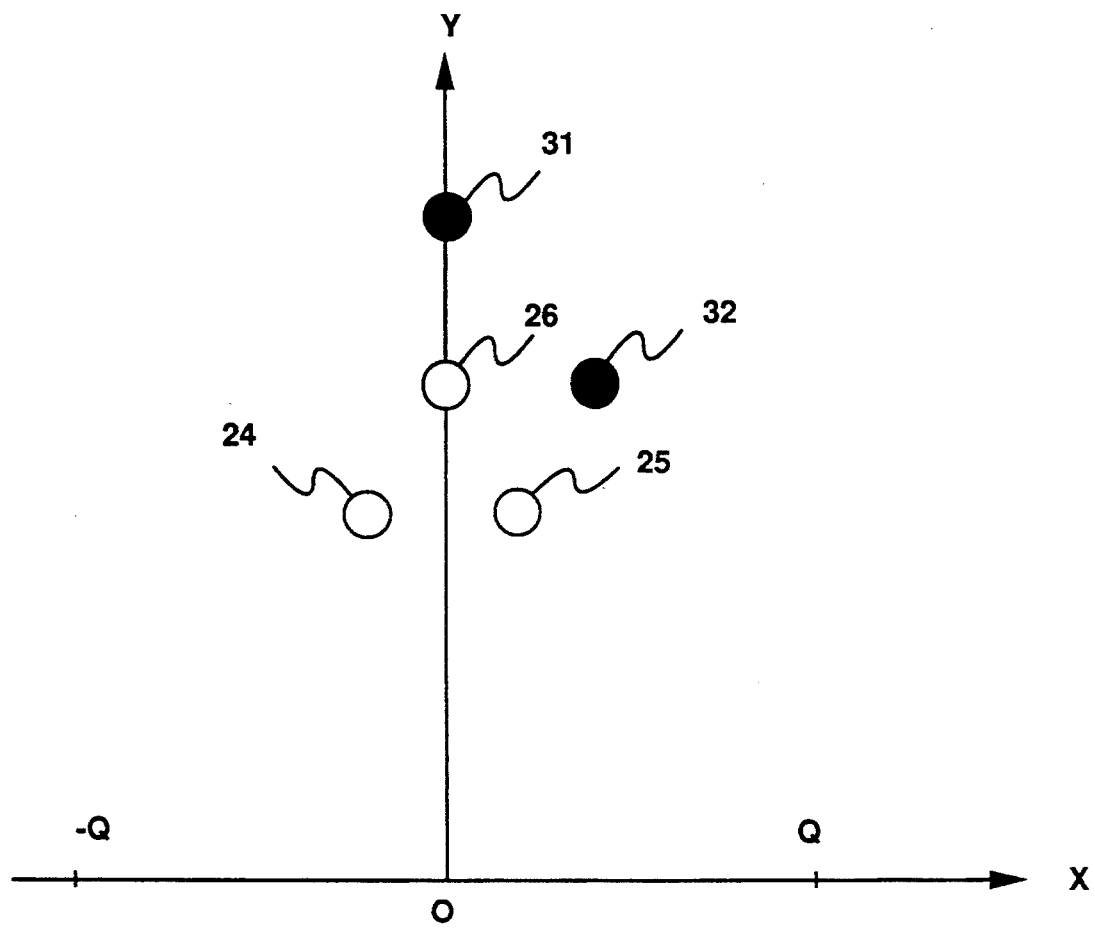
FIG. 7. schematically illustrates a cross-sectional view of an electric power transmission system employing the concept of asymmetric current splitting (split phase)

The following table indicates the current in each conductor of the array of FIG. 7 as well as the x, y coordinates of each conductor:

| CONDUCTOR # | PHASES | CURRENT IN AMP (A) | X-Y COORDINATES |
|---|---|---|---|
| 24 | B | 500 | −5.0, 14.0 |
| 25 | C | 500 | 5.0, 14.0 |
| 26 | A | 1000 | 0.0, 22.66 |
| 31 | C | 500 | 0.0, 32.66 |
| 32 | B | 500 | 10.0, 2266 |

Figure 15A:
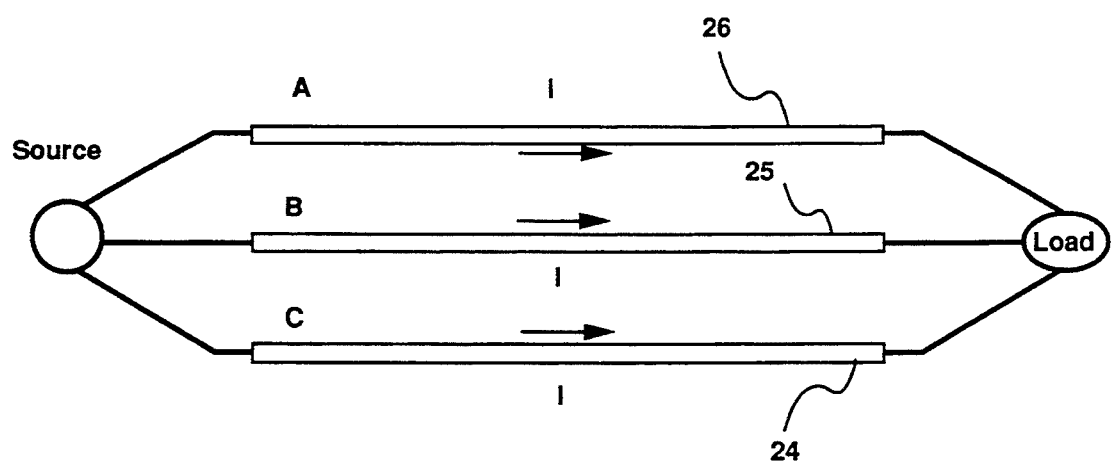
FIG. 15a schematically illustrates a conventional three-phase arrangement between a source and a load.
Figure 15B:
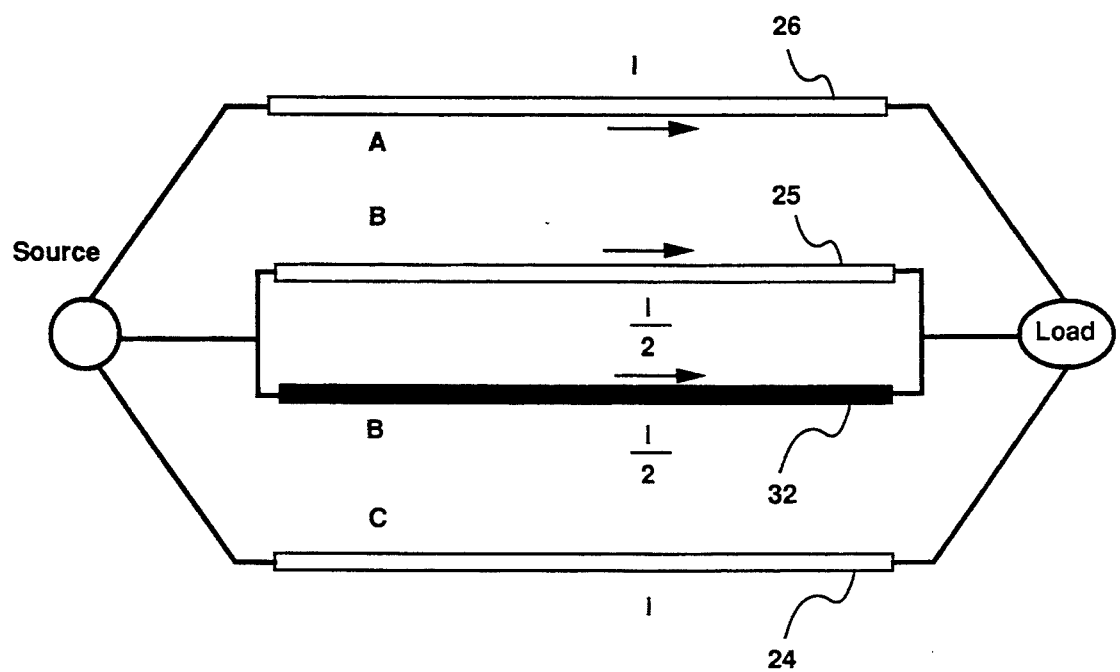
FIG. 15b schematically illustrates an arrangement for the splitting of the current of a phase in half in accordance with the invention.

Referring to FIGS. 15a, wherein like reference characters indicate like parts as above, the current may be split in only one phase B as indicated. In this respect, the added conductor 32 is connected in parallel to the conductor 25 otherwise carrying current in phase B. In this way, ½ of the current is carried in each of the respective conductors 25, 32. As above, the additional conductor 32 has the same electrical characteristics as the main conductor 25 and is connected to the same voltages. When two similar conductors 25, 32 are connected in parallel, half of the total current flows through each.

Figure 8:
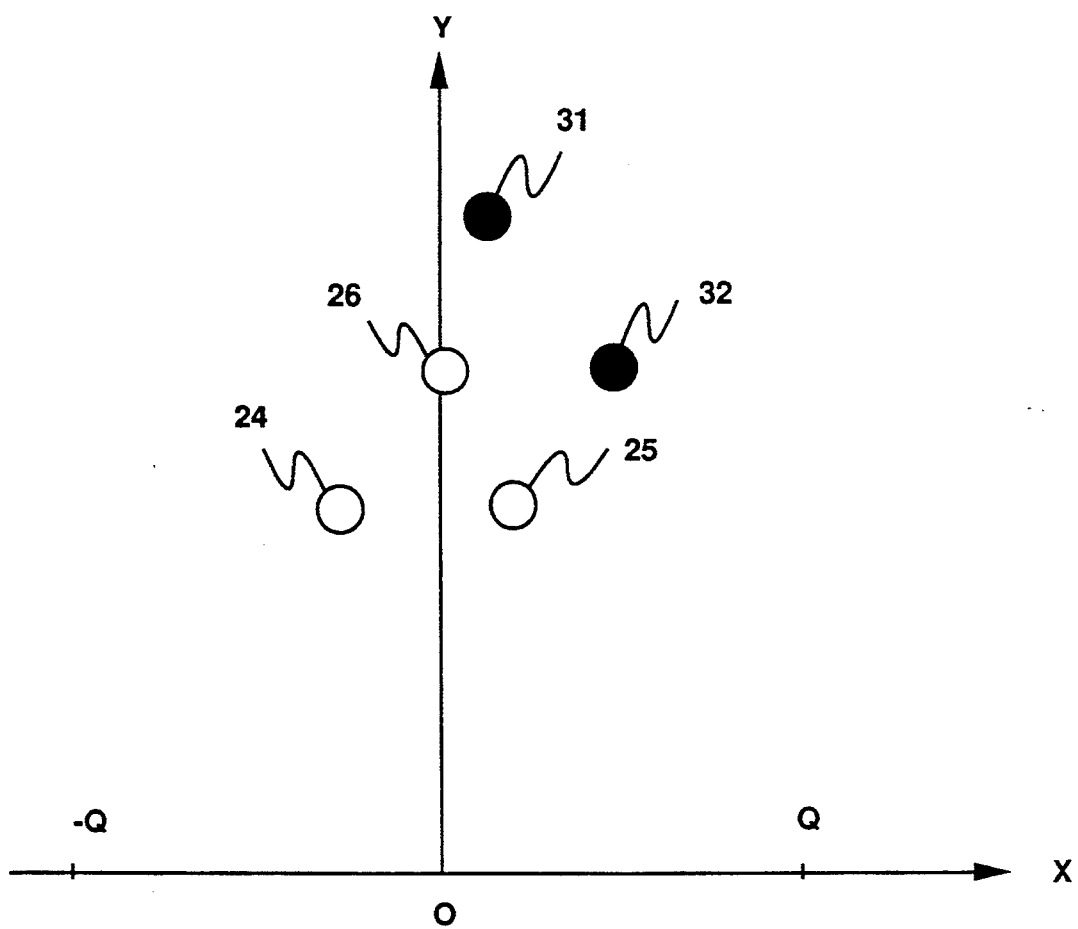
FIG. 8. schematically illustrates a cross-sectional view of an electric power transmission system employing asymmetrically selected conductor locations together with the concept of current splitting.

The configuration of FIG. 7 can be modified to further mitigate the magnetic fields at the edge of the right of way. We searched about 60000 different additional conductor locations using the concept of current splitting. Out of these configurations one effective method of transmission of electric power is shown schematically in FIG. 8. The comparative magnetic field magnitudes generated by different methods of transmission of electric power

| CONFIGURATION | MAGNITUDE OF MAGNETIC FIELD IN mG | |
|---|---|---|
| | AT −Q | AT Q |
| CONVENTIONAL DELTA METHOD | 17.15 | 17.15 |
| ASYMMETRIC TWO PHASE-SPLIT DELTA of (FIG. 7) | 8.5 (53%) | 4.3 (75%) |
| ASYMMETRIC TWO PHASE-SPLIT DELTA of (FIG. 8) | 9.35 (45%) | 1.07 (93%) |

| CONDUCTOR # | PHASES | CURRENT IN AMP | X-Y COORDINATES |
|---|---|---|---|
| 24 | B | 500 | −7.0, 14.0 |
| 25 | C | 500 | 3.0, 14.0 |
| 26 | A | 1000 | 0.0, 22.6 |
| 31 | C | 500 | 2.0, 36.6 |
| 32 | B | 500 | 10.0, 26.6 | values generated by the existing delta method of transmission of electric power can be reduced by 45% and 93% at selected locations −Q and Q respectively in comparison to conventional configuration. Thus, this example in accordance with the invention demonstrates a method of transmission and distribution of electric power via the concept of asymmetric current splitting to obtain substantial mitigation of the magnetic fields at selected location(s).

EXAMPLE 5

Figure 9:
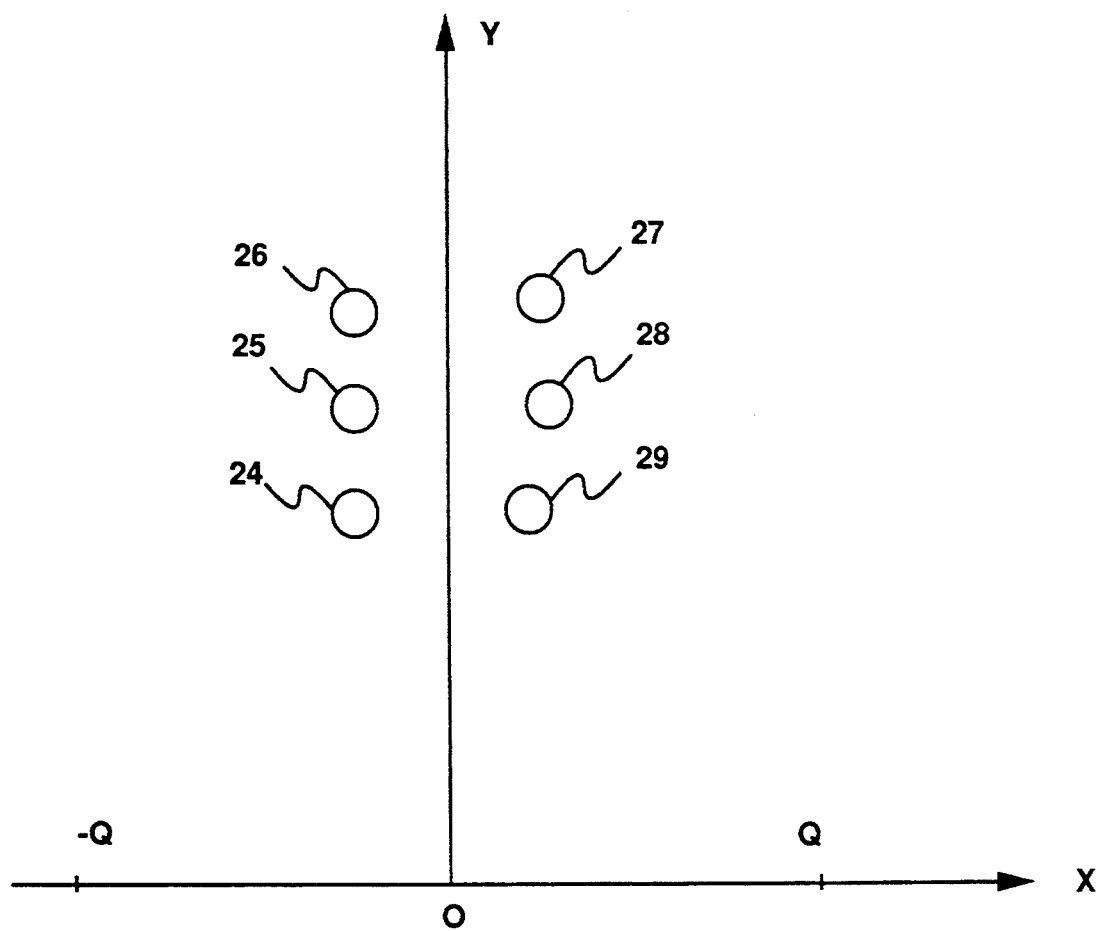
FIG. 9. schematically illustrates a cross-sectional view of an electric power transmission system employing asymmetrically located conductors together with appropriately selected typical asymmetric current magnitudes at each conductor.

Method of transmission of electric power employing asymmetrically located conductors together with appropriately selected current magnitudes Considering the previously known method of transmission and distribution of electric power, i.e., the conventional, symmetric double circuit based low reactance circuit, shown in FIG. 2b with 1000 A current per phase; this method of transmission generates a 12.0 mG magnetic field at the edge of the right of way. In this example, magnetic field mitigation at point −Q is demonstrated by varying both the locations of the conductors (i.e. conductors 25, 27, 28) and the magnitudes of the currents flowing through them. The constraints imposed on the program are as explained in Examples 1 and 2. FIG. 9 illustrates an asymmetric location of the conductors wherein the right-hand lowermost conductor 29 is closer to the vertical plane than the overhead conductors 27, 28. In addition, the magnitudes of the currents flowing through the six conductors are as indicated in the following table. The table also provides a comparison of the magnetic field magnitudes obtained by the arrangement of FIG. 9 relative to a conventional arrangement.

| CONFIGURATION | MAGNITUDE OF MAGNETIC FIELD IN mG | |
|---|---|---|
| | AT −Q | AT Q |
| CONVENTIONAL LOW-REACTANCE | 12.02 | 12.02 |
| ASYMMETRIC LOW-REACTANCE | 1.19 (90%) | 19.53 |

| CON-DUCTOR # | PHASES | CURRENT IN AMP | X-Y COORDINATES |
|---|---|---|---|
| 24 | C | 600 | −5.0, 14.0 |
| 25 | B | 450 | −4.5, 24.0 |
| 26 | A | 1000 | −5.0, 34.0 |
| 27 | C | 1400 | 6.25, 34.0 |
| 28 | B | 1550 | 5.5, 24.0 |
| 29 | A | 1000 | 5.0, 14.0 |

This method of transmission generates a magnetic field of 1.19 mG at −Q, thereby generating a 90% reduction in the magnitude of the magnetic field at that location, By proper selections of more than one parameter of an electric power line, the magnetic field magnitude can be reduced by one order of magnitude from the best known configuration of the prior art. This example demonstrates that in accordance with the invention the asymmetrical selection of the conductor positions and the current magnitudes can generate substantial mitigation of magnetic fields at the edge of the right of way.

EXAMPLE 6

Method of transmission of electric power employing asymmetrically placed conductors together with a cup shaped magnetic field mitigating body In the examples given above the preferred location was chosen as one edge of the right of way and the optimization routines were executed without introducing limits on the magnetic field at the other edge of the right of way.

Figure 10:
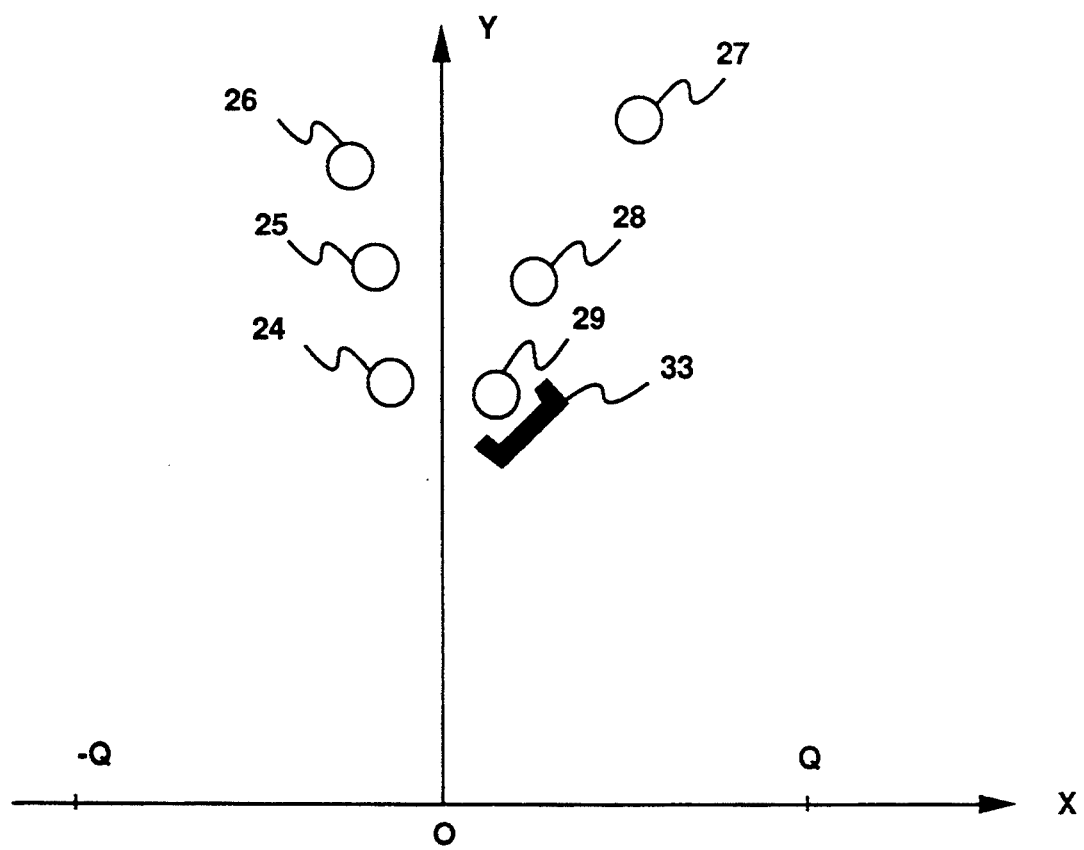
FIG. 10. schematically illustrates a cross-sectional view of an electric power transmission system employing asymmetrically placed conductors in conjunction with a cup shaped magnetic field mitigating body placed adjacent to the lowest conductor in accordance with the invention.

However, it is possible to select the conductor locations asymmetrically such that the magnetic fields on one side of the right of way are mitigated without affecting the magnetic fields on the other side of the right of way. An example of such a method of transmission of electric power is shown in FIG. 10. The locations of the conductors 24–29 of a double circuit were optimized by numerical simulation. This configuration generates a magnetic field of 4.0 mG at −Q and 11.9 mG at Q as compared to the 12.0 mG obtained with the corresponding conventional, symmetric, low reactance configuration.

A second point explored in this example is the mitigation of the magnetic field at the preferred location Q by means of a magnetic field mitigation body 33. A cup shaped but hollow magnetic field mitigating body 33 of overall dimensions 7.0 m×0.75 m is placed close to the lowermost conductor 29 as shown in FIG. 10. The mitigating body 33 reduces the magnetic field at the preferred location Q by 35% to 7.9 mG. This example demonstrates that it is possible to select conductor locations for the transmission of electric power in such a way that the magnetic field mitigation on one side of the right of way is achieved without adversely affecting the magnetic field magnitude at the other side of the right of way.

The following table indicates the result obtained in the above example:

| CONFIGURATION | MAGNITUDE OF MAGNETIC FIELD IN mG | |
|---|---|---|
| | AT −Q | AT Q |
| CONVENTIONAL LOW-REACTANCE | 12.02 | 12.02 |
| ASYMMETRIC LOW REACTANCE WITHOUT MITIGATING BODY | 4.0 | 11.9 |
| ASYMMETRIC LOW REACTANCE WITH MITIGATING BODY | 4.1 (66%) | 7.9 (35%) |

| CONDUCTOR # | PHASES | X-Y COORDINATES |
|---|---|---|
| 24 | C | −4.0, 21 |
| 25 | B | −3.0, 30 |
| 26 | A | −3.5, 39 |
| 27 | C | 11.0, 41.8 |
| 28 | B | 8.3, 29.0 |
| 29 | A | 5.0, 20.0 |

EXAMPLE 7

Figure 11:
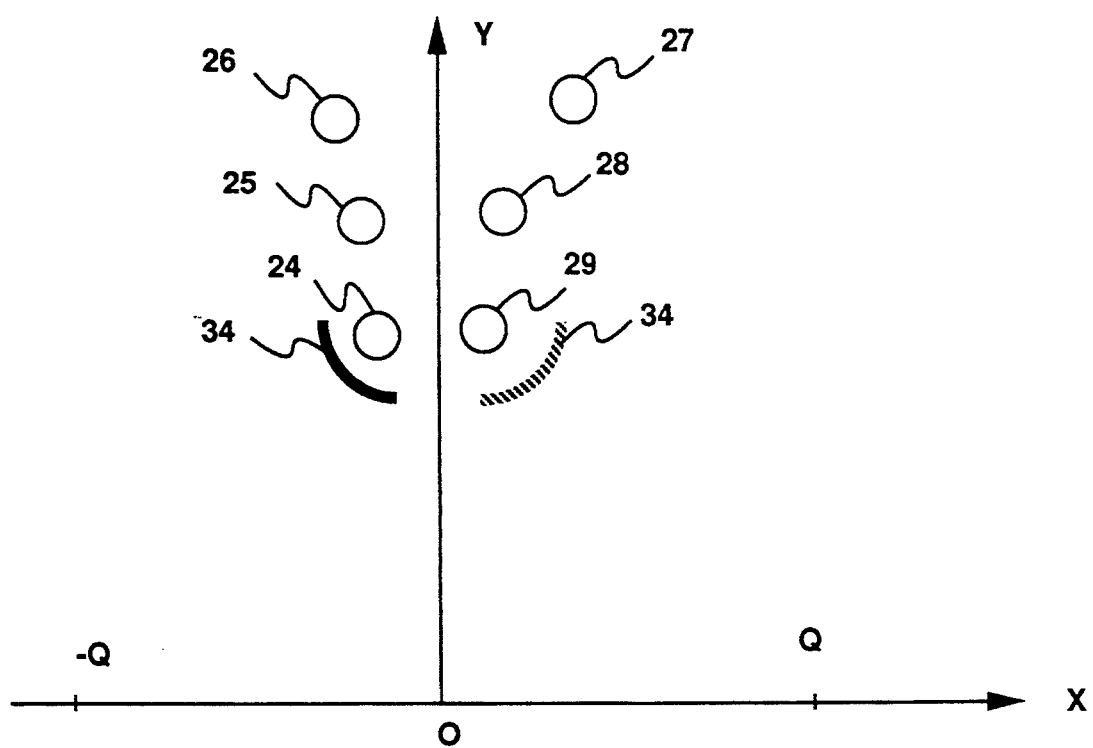
FIG. 11. schematically illustrates a cross-sectional view of an electric power transmission system employing asymmetrically placed conductors in conjunction with an arc shaped magnetic field mitigating body placed adjacent to a lowermost conductor in accordance with the invention.

Method of transmission of electric power employing asymmetrically placed conductors in conjunction with an arc shaped magnetic field mitigating body The numerical routines used to select the parameters for magnetic field mitigation were also employed to search for conductor locations for a double circuit which would yield magnetic field reductions on both sides of the right of way. One representative configuration discovered to satisfy this requirement is shown in FIG. 11. This particular configuration generates magnetic field magnitudes of 4.97 mG at −Q and 7.58 mG at Q. These field values correspond to reductions of 59% and 37%, respectively, as compared to the magnetic field magnitude of 12.0 mG generated by the conventional symmetric, low reactance configuration.

The magnetic field mitigation obtained by this method of transmission and distribution of electric power on both sides of the right of way can be further enhanced by using a magnetic field mitigating body 34 as shown in FIG. 11. Placing a 5 m arc shaped magnetic field mitigating body 34 adjacent to the lowest conductor 24 as shown in FIG. 11, the magnetic fields can be reduced by 78% at −Q and 42% at Q. On the other hand, moving the same mitigating body 34 to the other side of the circuit and by placing the body 34 close to the lowest conductor 29, the magnitude values of the magnetic field can be reduced by 60% at −Q and 57% at Q. If two mitigating bodies are placed, the reductions obtained become 79% at location −Q and 58% at location designated as Q. This example demonstrates that it is possible to achieve a system of transmission of electric power which is capable of mitigating the magnetic fields on both sides of the right of way using the methodologies outlined.

The following table indicates the results obtained with respect to FIG. 11:

| CONFIGURATION | MAGNETIC FILE IN mG | |
|---|---|---|
| | AT −Q | AT Q |
| CONVENTIONAL LOW-REACTANCE | 12.02 | 12.02 |
| ASYMMETRIC LOW REACTANCE WITHOUT MITIGATING BODY | 4.97 | 7.58 |
| ASYMMETRIC LOW REACTANCE WITH MITIGATING BODY ON LEFT | 2.54 (78%) | 6.92 (42%) |

| | -continued | |
|---|---|---|
| ASYMMETRIC LOW REACTANCE WITH MITIGATING BODY ON RIGHT | 4.74 (60%) | 5.13 (57%) |
| ASYMMETRIC LOW REACTANCE WITH MITIGATING BODIES ON BOTH SIDES | 2.5 (79%) | 5.0 (58%) |

| CONDUCTOR # | PHASES | X-Y COORDINATES |
|---|---|---|
| 24 | C | −4.0, 23 |
| 25 | B | −3.0, 32 |
| 26 | A | −3.5, 41 |
| 27 | C | 9.0, 43.8 |
| 28 | B | 6.25, 33.0 |
| 29 | A | 5.0, 24.0 |

Mitigation at locations within the right of way

In the examples discussed the mitigation locations were selected at the edge of the right of way. However, the method of mitigation can also be used to mitigate the magnetic fields within the edge of the right of way.

The magnetic field magnitude at location 'O' directly at the centerline of the conventional low reactance configuration shown in FIG. 10 is 63.7 mG. The magnetic field magnitude reduces to 22.55 mG by the utilization of the asymmetric low-reactance configuration of FIG. 10 without using a mitigating body. The field magnitude at location O reduces to 12.9 mG when the mitigating body shown in FIG. 10 is placed close to the lowest right conductor. Thus, the magnetic field is reduced by 80% as compared to the conventional low-reactance configuration at the location O, which is at the axis of symmetry of the right of way.

Similarly, the asymmetrical configuration of FIG. 11 generates a magnetic field magnitude of 15.83 mG at location 'O' as compared to the 63.7 mG generated by the corresponding low reactance configuration. This field drops from 15.83 mG to 7.0 mG in the presence of the two magnetic field mitigating bodies of FIG. 11. Thus, magnetic field mitigation of 89% is achieved at location 'O', found at the axis of symmetry of the right of way as compared to the corresponding conventional low-reactance configuration.

The invention thus provides a new method of transmission and distribution of electric power which mitigates the magnetic field substantially at selected locations. In particular, the invention provides appropriate design and control of the circuit parameters in conjunction with magnetic field mitigating bodies to transmit and distribute the same amount of electric power while mitigating the generated magnetic fields substantially at selected locations.

Description of the invention for mitigating the magnetic fields generated by sources with unknown or difficult to characterize internal current distributions As shown earlier for magnetic field sources with known current distributions, like the electric power transmission and distribution lines, the magnetic field distribution in the surrounding space can be determined with accuracy employing the analytical or numerical solutions of Maxwell's equations. However, there are many current bearing sources of magnetic fields found in power transmission, distribution and utilization which involve unknown or difficult to characterize current distributions. For such cases, mitigating magnetic bodies of proper shape, dimensions and physical properties can be designed and implemented to reduce the magnetic field at desired locations. Under such cases, it is necessary to experimentally characterize the magnetic field distribution surrounding the current bearing sources, under typical working conditions, to be used as the basis for designing and implementing mitigating bodies to be installed in close proximity to the source. In the following, this methodology will be explained and preferred embodiments in conjunction with a transformer device will be presented.

Measurement Method

At a given point in space, a three dimensional sinusoidal magnetic field can be expressed in terms of its components as:

$$B_x = B_{xm} \cos(\omega t + \theta) \quad (4)$$

$$B_y = B_{ym} \cos(\omega t + \phi) \quad (5)$$

$$B_z = B_{zm} \cos(\omega t + \Psi) \quad (6)$$

The time variation of each component is defined by the angular frequency, the magnitude of the component, and its phase angle. The resultant magnetic field vector varies ellipsoidally as a function of time. The major axis of the ellipsoid, $B_m$, represents the maximum magnetic field at the given point. The magnetic field is completely characterized by measuring the magnitudes, $B_{xm}$, $B_{ym}$, $B_{zm}$, and phase angles, $\theta$, $\phi$, $\Psi$, given in equations 4–6.

Figure 12:
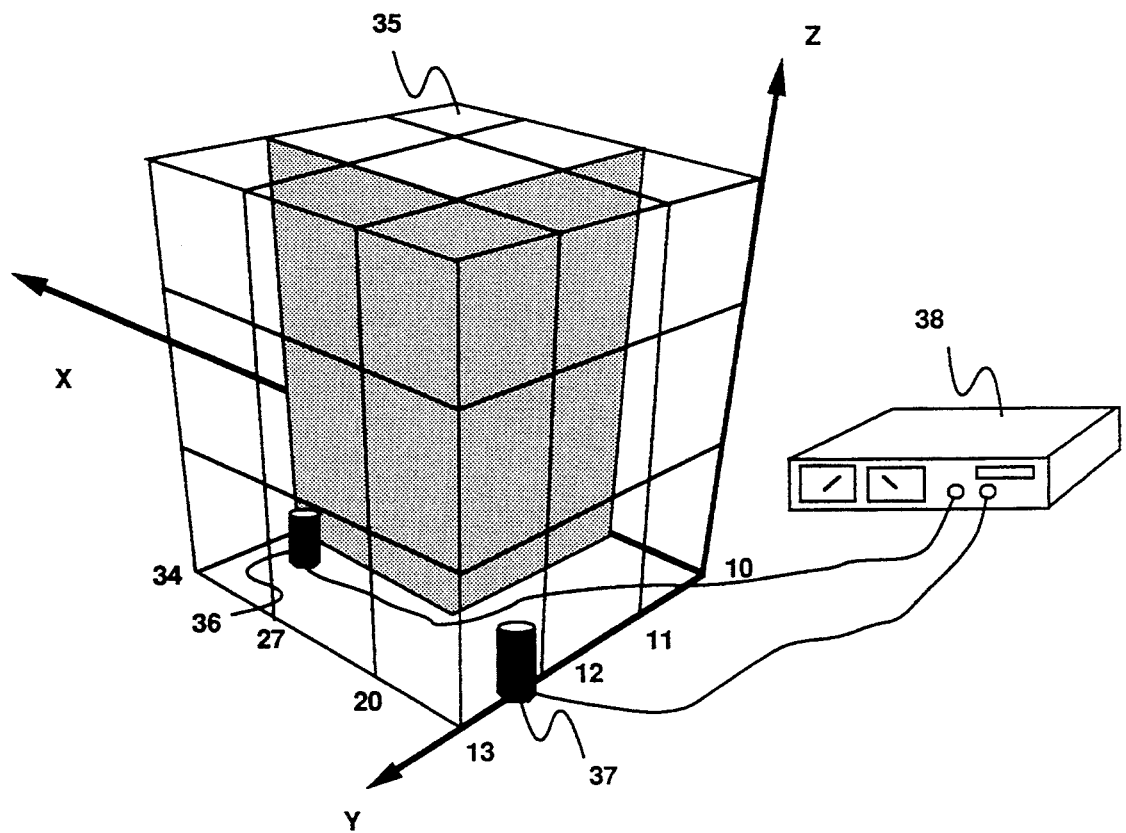
FIG. 12. is a schematic representation of experimental apparati used in designing and implementing of a thin mitigating body for a transformer.

Referring to FIG. 12, an experimental apparatus was constructed using a transformer 35 such as a three-phase transformer, a reference sensor 36 positioned at a fixed point adjacent the transformer 35 in order to measure the magnetic field thereat and one or more sensors 37 which can be moved about the transformer 35 in order to measure the magnitude of the magnetic field at various points. While a voltmeter (not shown) may be used to measure the magnitude of the sinusoidal electrical signal generated by the magnetic field sensor 37, such a voltmeter cannot measure the phase angle. Accordingly, a means, such as a EG&G PAR 5209 38, is used as an instrument that can measure both parameters. The lock-in amplifier 38, such as an EG&G Princeton Applied Research Model 5209, requires two inputs: the unknown signal provided to the signal input (via the sensor 37) and a reference signal provided to the reference input (via the reference sensor 36). The unknown signal is electronically multiplied with the reference signal. The resultant of the multiplication consists of a DC and an AC component. The AC component is filtered out. The DC component is maximized by means of a phase shifter. The magnitude of the unknown signal is calculated from the DC component and the phase of the unknown signal with respect to the reference is obtained from the phase shifter.

Procedure

Figure 13:
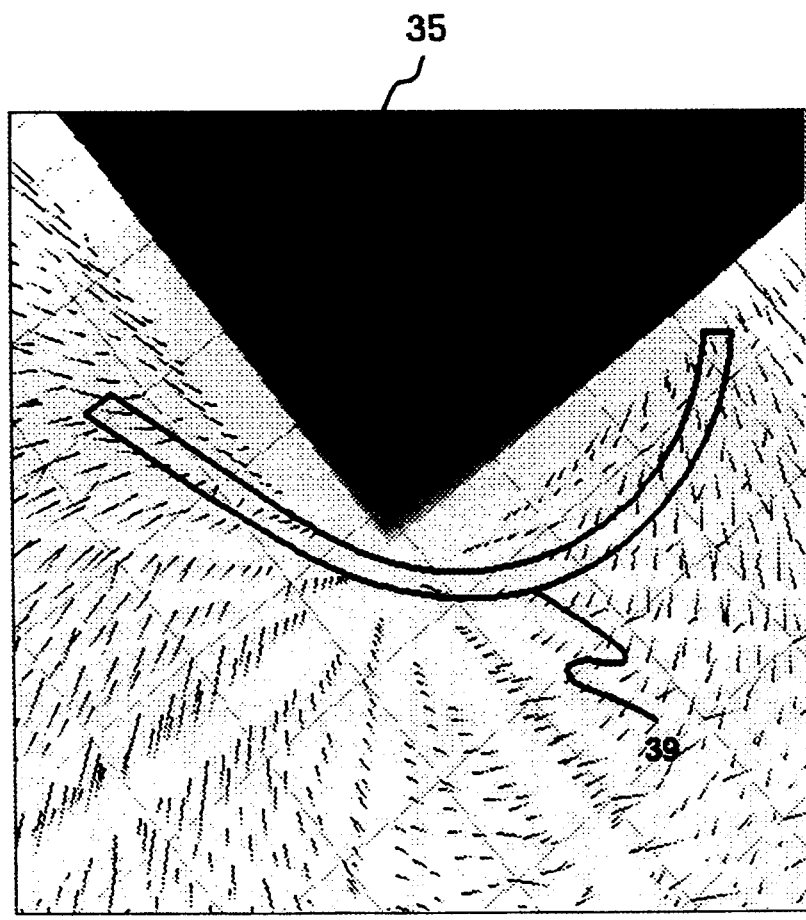
FIG. 13. illustrates an experimentally determined distribution of the magnetic field vectors around the transformer of FIG. 12.

1. Select a three dimensional grid around the magnetic field generating source (i.e. transformer 35). The size of the grid must be chosen such that the gradient of the magnetic field at the outermost locations are small;
2. Measure the magnitude and the phase angle of the components of the magnetic field at each point on the grid via the movable sensor 37 and lock-in amplifier 38;

3. Choose the location where maximum mitigation is desired;
4. Determine the time level, t*, at which the magnetic field reaches its maximum value at the chosen location;
5. Calculate the magnetic field components at all grid locations at time t=t*;
6. Plot the magnetic field vectors over the grid to obtain a map at time, t*. If the grid chosen for the measurements is too coarse, the measured magnetic fields need to be interpolated over a finer computational grid; FIG. 13 represents an experimentally determined distribution of the magnetic field vectors around the transformer 35 which were mapped at time, t*, at which the magnetic field magnitude reaches its maximum value at the location at which mitigation is desired. Here, the length of the arrow is proportional to the magnitude of the magnetic field vector and the direction of the arrow is the same as that of the magnetic field vector; and
7. Determine the shape of the magnetic mitigating body 39 such that the contours of the mitigating body will align with the magnetic field vectors at time t*. The proximity of the mitigating body 39 to the source 35 (see FIG. 14), can be determined to maximize the magnetization without saturating the magnetic material. The dimensions of the magnetic body 39 are chosen to obtain the desired reduction in the magnetic field. The shape and size of the mitigating body are optimized using numerical simulations of Maxwell's equations.

EXAMPLE

Figure 14:
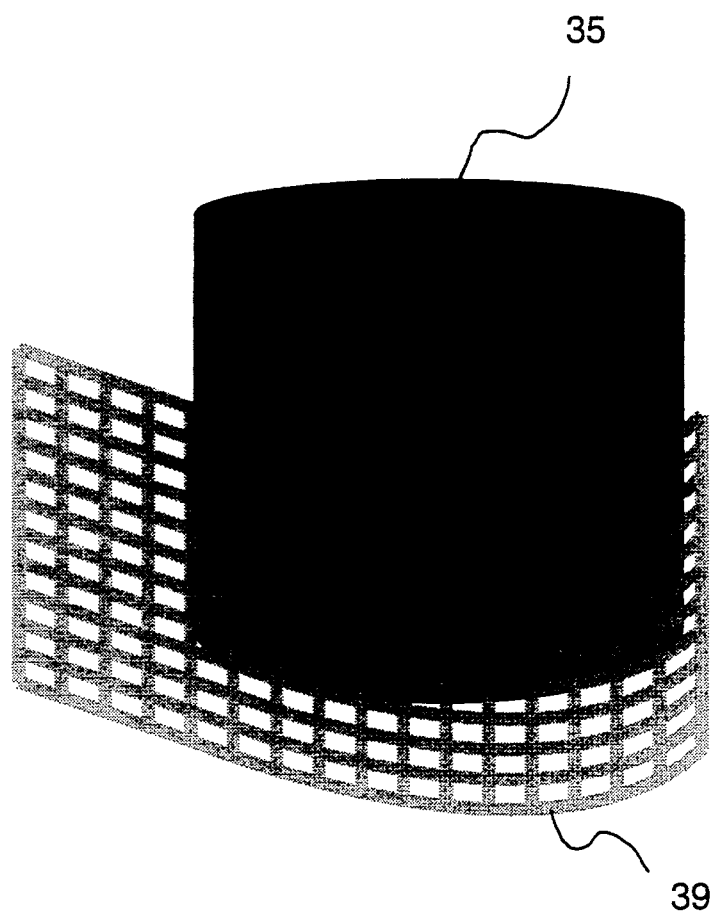
FIG. 14. is a schematic representation of a magnetic body implemented mitigate the magnetic field generated by a three-phase transformer.

A three phase transformer 35 is chosen as a test example for the procedure given above. The dimensions of the transformer are 40cm×40cm×40cm. The magnetic field components are measured on a 4×4×4 grid of spacing 20 cm by using the experimental arrangement shown in FIG. 12. The locations where mitigation of the magnetic field is desired are selected as locations designated 11, 12, 13, 20 and 27. Based on the measurements at location 12 the time level at which the field is maximum, t*, was estimated. The magnetic field vectors over the entire grid were mapped at t=t* and are shown in FIG. 13-14 along with the mitigating magnetic body 39, the shape of which is fitted to the contours of the magnetic field vectors at time, t*. The magnetic body consisted of 4 layers of amorphous metal Metglas 2705MN ribbons (2" wide, thickness 0.002 cm) arranged on a square mesh. The overall dimensions of the magnetic body were 80cm×40cm. The maximum magnetic field values obtained with and without this magnetic body and the corresponding reductions in the magnetic field are listed in Table 5.

TABLE 5

Magnitude of the magnetic field mG with and without the magnetic field mitigating body.

| LOCATION | Without the Magnetic Body (mG) | With the Magnetic Body (mG) | Mitigation % |
|---|---|---|---|
| 11 | 132.9 | 39.2 | 70 |
| 12 | 91.4 | 27.2 | 70 |
| 13 | 48 | 17.4 | 64 |
| 20 | 128.6 | 32.8 | 74 |
| 27 | 159.3 | 62.3 | 61 |

This example shows that, following the procedure described above, substantial mitigation of the magnetic fields, i.e., reductions reaching 74%, can be obtained at the selected locations with a relatively small and thin magnetic body with proper shape, dimensions and physical properties determined according to the teachings of this invention.

The invention thus provides a method of transmission and distribution of electric power which is able to mitigate the generated magnetic fields at preferred locations by proper selection of the parameters of the electric circuit without adhering to a symmetry with respect to the centerline of a right of way.

Further, the invention provides a method of mitigating the magnetic fields generated by current bearing sources with unknown or difficult to characterize current distributions, such as power transformers.

What is claimed:

1. An electric power transmission system comprising a plurality of sequentially arranged supports disposed along a right of way; and
   at least two sets of three phase current conductors mounted on and along said supports and disposed longitudinally of said right of way, said conductors of at least one set being disposed in an array asymmetrically of a vertical plane passing through said array and asymmetrically of the other set.

2. An electric power transmission system as set forth in claim 1 which further comprises a magnetic field mitigation body spaced from and extending along one of said conductors of said one set to mitigate a magnetic field at a predetermined point along said right of way.

3. An electric power transmission system as set forth in claim 1 which further comprises means for distributing current to said conductors in asymmetric relation to mitigate a magnetic field at a predetermined point along said right of way.

4. An electric power transmission system as set forth in claim 3 which further comprises means for shifting the phase angle of a current flowing in at least one predetermined length of at least one of said conductors to mitigate a magnetic field at a predetermined point along said right of way.

5. An electric power transmission system as set forth in claim 1 which further comprises means for shifting the phase angle of a current flowing in at least one predetermined length of at least one of said conductors to mitigate a magnetic field at a predetermined point along said right of way.

6. An electric power transmission system comprising a plurality of sequentially arranged supports disposed along a right of way;
   at least one set of three current conductors mounted on and along said supports and disposed longitudinally of said right of way; and
   means for distributing current to said conductors in asymmetric relation to mitigate a magnetic field at a predetermined point along said right of way.

7. An electric power transmission system comprising a plurality of sequentially arranged supports disposed along a right of way;
   at least one set of three current conductors mounted on and along said supports and disposed longitudinally of said right of way;
   means for shifting the phase angle of a current flowing in at least one of said conductors in at least one predetermined length of said one conductor to mitigate a magnetic field at a predetermined point along said right of way.

8. An electric power transmission system as set forth in claim 7 wherein said means includes a capacitor in series with said one conductor.

9. An electric power transmission system comprising
 a plurality of sequentially arranged supports disposed along a right of way;
 at least one set of three current conductors mounted on and along said supports and disposed longitudinally of said right of way, said conductors being disposed in a delta array symmetrically of a vertical plane passing through said array;
 a first additional current conductor mounted on and along said supports parallel to and asymmetric of said set of conductors;
 first means for splitting a flow of current between said first additional conductor and a first conductor of said set;
 a second additional current conductor mounted on and along said supports parallel to and asymmetric of said set of conductors; and
 second means for splitting a flow of current between said second additional conductor and a second conductor of said set to mitigate a magnetic field at a predetermined point along said right of way.

10. The combination of
 a current bearing source having a magnetic field generated in surrounding relation to said source during conduction of current in said source; and
 a magnetic mitigating body disposed adjacent said current bearing source to mitigate said magnetic field at a predetermined point spaced from said current bearing source.

11. A method of transmitting electrical power comprising the steps of
 arranging at least one set of three current conductors on a plurality of supports disposed along a right of way, said conductors being disposed in an array asymmetrically of a vertical plane passing through said array; and
 passing current through said conductors while generating a magnetic field transversely of said conductors in dependence on said current, said asymmetric array of said conductors effecting mitigation of said magnetic field at a predetermined point along said right of way.

12. A method as set forth in claim 11 which further comprises the step of distributing current to said conductors in asymmetric relation to further mitigate the magnetic field at said point along said right of way.

13. A method as set forth in claim 12 which further comprises the step of shifting the phase angle of a current flowing in at least one predetermined length of at least one of said conductors to further mitigate the magnetic field at said point along said right of way.

14. A method as set forth in claim 11 which further comprises the step of shifting the phase angle of a current flowing in at least one predetermined length of at least one of said conductors to further mitigate the magnetic field at said point along said right of way.

15. A method as set forth in claim 11 which further comprises the steps of splitting a flow of current between one of said conductors and at least a fourth conductor extending in parallel to and asymmetrically of said one conductor to further mitigate the magnetic field at said point along said right of way.

16. A method of mitigating a magnetic field generated by a current bearing source comprising the steps of
 measuring a magnetic field generated in surrounding relation to a current bearing source during conduction of current in said source; and
 positioning a magnetic mitigating body adjacent said current bearing source to mitigate said magnetic field at a predetermined point spaced transversely from said current bearing source.

17. A method of transmitting electrical power comprising the steps of
 arranging at least one set of three current conductors on a plurality of supports disposed along a right of way, said conductors being disposed in an array symmetrically of a vertical plane passing through said array; and
 distributing current to said conductors in asymmetric relation to mitigate the magnetic field at predetermined point along said right of way.

18. A method as set forth in claim 17 which further comprises the step of shifting the phase angle of a current flowing in at least one predetermined length of at least one of said conductors to further mitigate the magnetic field at said point along said right of way.

19. A method of transmitting electrical power comprising the steps of
 arranging at least one set of three current conductors on a plurality of supports disposed along a right of way, said conductors being disposed in an array symmetrically of a vertical plane passing through said array; and
 shifting the phase angle of a current flowing in at least one predetermined length of at least one of said conductors to mitigate the magnetic field at a predetermined point along said right of way.

20. An electric power transmission system comprising
 a plurality of sequentially arranged supports disposed along a right of way;
 at least one set of three phase current conductors mounted on and along said supports and disposed longitudinally of said right of way, said conductors being disposed in an array asymmetrically of a vertical plane passing through said array;
 at least one additional current conductor mounted on and along said supports parallel to and asymmetric of said set of conductors;
 first means for splitting a flow of current between said first additional conductor and a first conductor of said set;
 a second additional current conductor mounted on and along said supports parallel to said set of conductors; and
 second means for splitting a flow of current between said second additional conductor and a second conductor of said set to mitigate a magnetic field at a predetermined point along said right of way.

* * * * *